United States Patent
Moore et al.

(10) Patent No.: US 7,047,520 B2
(45) Date of Patent: May 16, 2006

(54) COMPUTER SYSTEM WITH WATCHPOINT SUPPORT

(75) Inventors: Richard John Moore, Waterlooville (GB); Suparna Bhattacharya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 10/121,898

(22) Filed: Apr. 11, 2002

(65) Prior Publication Data

US 2003/0084375 A1 May 1, 2003

(30) Foreign Application Priority Data

Oct. 25, 2001 (GB) .................................. 0125628.8

(51) Int. Cl.
*G06F 9/44* (2006.01)
(52) U.S. Cl. ..................... 717/129; 714/34; 712/244; 710/266
(58) Field of Classification Search ........ 717/124–135; 710/260–269; 711/6; 718/106; 712/244
See application file for complete search history.

(56) References Cited

U.S. PATENT DOCUMENTS 5,598,553 A * 1/1997 Richter et al. ................ 703/23
5,611,043 A   3/1997 Even et al. ............ 395/183.14

* cited by examiner

*Primary Examiner*—Tuan Dam
*Assistant Examiner*—Andre R Fowlkes
(74) *Attorney, Agent, or Firm*—Stephen J. Walder, Jr.; Jeffrey S. LaBaw

(57) ABSTRACT

A method is provided that allows a general set of watchpoints to be defined for a computer system (a watchpoint is a memory address that triggers an interrupt for debugging or tracing purposes). This is accomplished by modifying the system page table for the memory page containing a watchpoint, such that a page fault interrupt is triggered whenever said memory page is accessed (for example by marking the page as not present). The paging mechanism of the computer system is then adapted, so that responsive to a page fault interrupt, a determination is made as to whether such interrupt has resulted from an access to the watchpoint, and if so, control is passed to a watchpoint handler. Alternatively, if there is no watchpoint, normal paging operations can be resumed if necessary.

23 Claims, 16 Drawing Sheets

COMPUTER SYSTEM WITH WATCHPOINT SUPPORT

FIELD OF THE INVENTION

The present invention relates to debugging computer programs, and in particular to a method of debugging or probing programs that involves use of a virtual memory paging mechanism.

BACKGROUND OF THE INVENTION

A watchpoint (also known as a hardware breakpoint) defines a contiguous range of addresses in computer memory that will trigger an interruption to program execution if any address within the range is referenced by the program. The interrupt so generated is known as a watchpoint interrupt, or alternatively as a debug interrupt or debug exception, since it is typically employed for debugging or monitoring purposes. A watchpoint interrupt causes current program execution to be suspended, and execution to continue in special code called a watchpoint (or debug) interrupt handler. Interrupts generated synchronously though execution of a machine instruction are frequently referred to as exceptions (the terms exception and synchronous interrupt are used interchangeably herein).

Watchpoint interrupts can be divided into three main classes, according to the type of access being made to the relevant address: execute, read or write. In the first case, known as an execution watchpoint, the watchpoint is triggered when the processor tries to execute the instruction stored in the relevant address. In the latter two cases, known as a storage watchpoint, the watchpoint is triggered when the processor tries to access data stored (or to be stored) in the relevant address.

Processors typically provide special registers and instructions for storage of watchpoint addresses and ranges. However, the number of available watchpoints is limited by the number of registers provided for this purpose. In one prior art architecture, known as IA32 (implemented by various 32-bit processors from Intel Corporation) there are debug registers to provide a watchpoint capability, and a maximum of four watchpoints can be defined, each with a corresponding address range of one, two or four bytes. This limitation can represent a significant constraint on the effectiveness of debugging operations using watchpoints. Another problem is that such restrictions on watchpoints tend to be processor specific, with little commonality across different architectures. For example, the IA64 architecture (implemented on 64-bit processors from Intel Corporation) has a significantly different watchpoint implementation from the IA32 architecture.

One particular parameter that tends to vary according to processor architecture is the timing of the watchpoint interrupt. Thus some processor architectures generate a watchpoint interrupt before the relevant instruction executes, whilst others generate it afterwards. The case of the IA32 architecture is more complex in that the timing of the interrupt depends on the nature of the instruction; execution watchpoints generate an interrupt before instruction execution, whereas storage access watchpoints occur after successful access to the relevant storage location.

The specific code that is invoked by the operating system as a result of a watchpoint interrupt is referred to herein as a watchpoint interrupt handler. The watchpoint interrupt handler usually invokes a debugging function. Frequently this function is not part of the core operating system, but rather some ancillary utility or program, such as a kernel debugger or application debugger.

Interrupt handlers are generally identified to the processor by having their starting addresses stored in memory locations reserved for this particular purpose. FIG. 1 illustrates the implementation in IA32, which uses an Interrupt Descriptor Table (IDT) 110 stored in system memory 100 to identify the interrupt handler appropriate for any particular interrupt. The IDT itself can in turn be located from the Interrupt Descriptor Table Register (IDTR) 102.

FIG. 1 also illustrates two particular interrupt handlers referenced from the IDT (it will be appreciated that typically there are many others). The first of these arises from a single-stepping mechanism supported by most processors. This enables debugging applications to allow one instruction in a debugged program to execute at a time, control being returned to the debugging application after each instruction is executed. The hardware implementation of this mechanism usually involves the generation of an interrupt to signal the completion of a single step. Under IA32 a specific IDT entry (shown as 111 in FIG. 1) is reserved for this purpose. This entry in turn references an interrupt handler 121 that is given control after a single-step interrupt, and is the known as the single-step interrupt handler.

The second interrupt handler in FIG. 1 is referenced from entry 112 in the IDT, and is a page fault interrupt handler 122. This handler is triggered by page fault exceptions generated in certain circumstances when storage is accessed, and is part of the system paging mechanism.

Thus as is well known, a paging mechanism is provided on many processors to enable programs to execute as if much more system memory were present than is really the case (up to the maximum provided by the address space, e.g. 4 Gbytes on a 32 bit system). The apparent memory seen by programs is known as virtual memory (or virtual storage), whereas the actual amount of memory installed is called physical memory or physical storage (on some architectures the term real is used instead of physical). The mismatch between virtual and physical memory is accommodated by using some form of additional external storage, typically a hard disk drive, as an overflow for physical storage.

The paging mechanism generally divides all of virtual memory into evenly sized segments known as pages; the page size is typically 4K bytes or 4M bytes, or some other value depending upon the processor architecture. Any given page of virtual memory is present either in system memory, or in the external overflow area, stored in the latter case in what is termed a swap or page file.

Programs cannot access data directly in the page file. Instead, the page manager component of the operating system has the task of copying of data saved in the page file into physical memory, from where it can be accessed by programs. This typically requires that other data in physical memory is first copied to the page file, in order to create some vacancy in physical memory.

The transfer of data between system and external memory (effectively between real and virtual memory) is carried out in units of pages, and hence is known as paging, or sometimes as swapping. This transfer is largely transparent to application programs, except that access to data in a page file will be much slower than access to system memory, to allow time for the necessary paging to be performed.

FIG. 2 illustrates the structures used for the management of virtual storage. A table (know as the page table) 220 is used to translate an address in virtual storage into an address in physical storage. A page table entry (PTE) 231, 232 is used to determine the location of the corresponding page 251, 252 in system memory 250.

In practice, the page table 220 is most commonly split into a hierarchy of tables, such as shown in FIG. 2. Thus the top level of the hierarchy, known as the page directory 210, contains entries that reference subtables in the next layer of the hierarchy. Each entry 211, 212 in the page directory specifies the range of pages detailed in its corresponding subtable 221, 222. Therefore, to locate a particular page, the page directory entries are first scanned to find the range that includes the desired page. This then allows the corresponding subtable to be searched, which in turn locates the PTE identifying the address of the desired page in system memory.

Also shown in FIG. 2 is a register 201. The processor uses this register (or some other reserved memory location) to locate the page table hierarchy. In the case of the IA32 architecture, there is a two-level page table hierarchy, and Control Register 3 (CR3) is used to locate the top of the hierarchy, i.e. the Page Directory 210.

It will be appreciated that while the hierarchy shown in FIG. 2 has two levels, other known systems have a different arrangement, depending on the total number of pages and other system parameters. For example, in some cases there may simply be one overall page table, in others the hierarchical structure may contain three or more levels. Since, the precise page table structure is not relevant to understanding the present invention, reference will simply be made in general terms herein to the page table and page table entries, irrespective of the precise implementation details.

For performance reasons, processors generally cache the most frequently referenced page table entries in an internal area, frequently referred to as the Translate Look-aside Buffer (TLB) (not shown in FIG. 2). If changes are made to page table entries by the operating system then the TLB will have to be resynchronised using purpose-built machine instructions. The IA32 architecture provides the Purge TLB instruction for this purpose; some other architectures allow specific TLB entries to be purged.

Although FIG. 2 only illustrates PTEs corresponding to pages that are located in system memory 250, it will be appreciated that there is in fact a PTE for each page, whether currently located in real or virtual memory. The PTE is therefore used to indicate to the processor whether or not the corresponding virtual storage page is mapped to a physical storage page, and if so, the identify of the physical page. This is reflected in the structure of a PTE shown schematically in FIG. 2A. The PTE 271 includes an index 271 to the location of the page, plus a set of status flags 275. One of these flags 276 is set according to whether or not the page is currently present in physical memory.

If the processor tries to access a page which is not in physical memory, but instead located in the page file, then a page fault interrupt or exception occurs. The current program execution is temporarily suspended and execution continues with the page fault handler. This is made known to the processor by the standard interrupt mechanism, which for the IA32 architecture is an appropriate entry in the IDT. Returning to FIG. 1, the page fault interrupt handler 122 is shown being referenced from IDT entry 112.

On receipt of an interrupt, the page fault handler 122 determines whether the interrupt occurred because of an erroneous storage access made by the program that was interrupted, or because the desired data is currently stored in the page file. In the latter case, the requested page is copied into an unused region of physical storage. The corresponding PTE is then updated, to indicate that the page is now present in system memory, and to identify the physical page where it is stored.

If there is no spare page in physical memory in which to store the incoming page, then space must first be made available. This is achieved by removing a page from physical memory, more particularly by copying its data to the page file, and then updating the page table entry accordingly. In addition, the page fault handler updates certain status information (not shown in FIG. 2) to indicate where in the page file to locate the removed page (or pages). The mechanism for this maintaining this status information is operating system specific, and need not concern us here.

Note that in order to handle the page fault, the address of the instruction causing the page fault and the accessed memory address for which the fault occurred are necessarily made available to the page fault handler 122 by the processor. The precise mechanism for passing this information is processor specific; in the case of IA32, the instruction address is pushed onto the stack used by the page fault handler, a memory area accessible from the Extended Stack Pointer Register (ESP), and the accessed memory address is presented in Control Register 2 (CR2).

The page table may be updated not only in response to a page fault, but also in certain other circumstances. Of particular relevance here is the situation for operating systems that provide a multi-tasking environment, where different tasks have task-specific views of virtual storage. This requires the operating system to maintain a (logically) separate copy of the page table for each task that has a task-specific view. Whenever a new task is run, the page manager (of which the page fault handler is a part) refreshes the processor's page tables so that it contains the data appropriate for the new task.

U.S. Pat. No. 5,611,043 describes a debugging system, which utilises the operating system paging mechanism to provide watchpoints, thereby overcoming limitations on the number of hardware breakpoints that can be supported. Thus a page for which a watchpoint is set is marked in the page table as "non-writable", whilst the correct information from the page is stored separately. When an attempt is made by the application being debugged to access the page, a page fault interrupt is raised because the page is apparently non-writable, which in turn passes control to the debugger. After any desired analysis, the page is restored to its original format, and the application allowed to proceed with a single step. This time the instruction executes correctly, rather than triggering the page fault, because of the updated page information, but hands control back to the debugger when it has completed its single step. The watchpoint is then restored by again altering the page table, so that it will trip again for any future accesses to the page, and the application is allowed to continue.

Although the system described in U.S. Pat. No. 5,611,043 offers significant advantages over hardware breakpoints, it too has certain limitations. For example, it is only effective for operating systems that provide a debugging interface with access to the paging mechanism, and even for operating systems that do have such a facility, there is little commonality across the different implementations. It is also restricted to task-specific watchpoints (i.e. the application actually being debugged), and so can't handle access from kernel-space rather than the user-space of the application.

SUMMARY OF THE INVENTION

Accordingly, the invention provides a method of providing a watchpoint in a computer system, said method comprising the steps of:

modifying the system page table for a memory page containing a watchpoint, such that a page fault interrupt is triggered when said memory page is accessed;

modifying the paging mechanism of the computer system, so that responsive to a page fault interrupt, a determination is made as to whether said interrupt has been triggered by an access to a watchpoint; and responsive to said determination being positive, passing control to a watchpoint handler.

The present invention utilises page fault interrupts (exceptions) to extend the number and ranges of watchpoints. Page-faults used for this purpose are generally referred to herein as pseudo-page faults and the set of watchpoints implemented in this manner for a given page as a pagepoint.

It will be appreciated that the prior art, in particular U.S. Pat. No. 5,611,043, also teaches the use of paging as a mechanism for triggering a watchpoint. However, the present invention modifies the system paging functionality in a quite different way from the prior art, thereby providing much more power and flexibility for investigating program behaviour. In particular, the system page table and paging mechanism are specifically modified to allow watchpoints to be defined, and if such a watchpoint is triggered, control is then passed to a watchpoint handler. This does away with the need for a debugging environment and has several advantages over the prior art. Thus the technique is extendable to all operating systems (with paging support), irrespective of the type of debugging facilities that they provide. It is also more efficient, in that program execution continues normally except for page fault interrupts, compared to the prior art approach where all interrupts are passed back to the debugger. In addition, setting watchpoints through a debugger is limited to user address space (for the application being debugged), whereas the present invention can be utilised with respect to both user and system space. Furthermore, the present invention provides a wider range of exploitation mechanisms, in that the watchpoint handler can be configured to take any desired action (for example, outputting selected trace information to a log file), rather than returning to a debugger.

In a preferred embodiment, a pagepoint table is provided. The entries in this pagepoint table correspond to memory pages, and information stored in the pagepoint table defines the watchpoints contained within each page. In one embodiment, the pagepoint table contains one entry for each page of memory (analogous to the system page table), whilst in another embodiment, the pagepoint table contains entries only for those pages that contain a watchpoint. The latter approach allows the pagepoint table to be much more compact, especially if pagepoints are defined for only a few pages, but does make it slightly more difficult to locate the pagepoint entry for a particular page. One efficient way of doing this is to have the page table entry for a page which contains a watchpoint include a reference to the entry in the pagepoint table for that page, although some other indexing method could be used instead.

In the preferred embodiment, a page table entry for a page includes a presence status, which indicates whether or not that page is currently present in system memory. If a page contains a watchpoint, the entry for the page in the system page table is modified. In particular, the presence status for the page is modified to indicate that such page is not currently present in memory (irrespective of the true current location of the page). The consequence of this is that when an attempt is made to access the page, a page fault is automatically generated, and hence this provides a mechanism for instituting a watchpoint. Note that the original presence status for the memory page (i.e. prior to modification) is stored in the pagepoint table entry for that page. Consequently, the true location of page remains known, and so it can be properly processed, even if a pagepoint is generated.

One complication is that on multi-tasking systems, the operating system typically maintains a different page table for each task (reflecting the particular memory usage of that task). This opens up the possibility of having task-specific watchpoints, in that different modifications can be made to the different page tables. Note that it is most convenient in this situation if a different pagepoint table is defined for each task. However, it may be desirable to have a common set of watchpoints across all tasks (this corresponds most directly to a hardware breakpoint). In this case all the task-specific page tables must be updated to reflect a new watchpoint—this can be done either when the watchpoint is defined, or for each task as it becomes active.

In one preferred multi-tasking embodiment, each pagepoint table comprises a task-specific component and a generic component that is common to all tasks. Typically the two table components are essentially separate tables, which logically act together as one overall table to cover all the address space. Note that the latter, generic component generally matches system space. since this is active for all tasks.

In most modern computing systems, the processor maintains its own copy of selected parts of the page table for rapid access in what is known as a table lookup buffer (i.e. this is effectively operating as a cache). It is therefore important that any modifications to the system page table are immediately propagated to the table lookup buffer, to ensure that proper cache synchronisation is maintained.

In the preferred embodiment, the determination as to whether said interrupt has been triggered by an access to a watchpoint comprises a two-step test. Firstly, it is tested whether the page for which the interrupt has been triggered contains any watchpoints, and if not, the interrupt is treated as a standard page fault interrupt (i.e. because the requested page is not present, rather than because of any artificial manipulations of the page table to indicate a watchpoint). Secondly, it is tested whether the address for which the interrupt has been triggered matches a watchpoint. This is because a page is a rather large granularity for a watchpoint, which might instead be required only for a small portion of a page. If this is indeed the case, then any access to the page will trigger an interrupt, but this will only be of interest if the requested address actually matches the specific address range of the watchpoint; otherwise the application can be allowed to proceed.

Note that in the preferred embodiment, certain measures are necessary to allow the application to proceed (either because the address that triggered the interrupt does not correspond to a watchpoint, or because it does, and the watchpoint handler has now completed). In particular, a straightforward attempt by the application to continue would immediately result in another attempt to access the memory location that originally generated the page fault, and processing would become locked in a circular loop. Therefore, before the application can proceed, the pagepoint for the page is removed (i.e. the original status of the page table entry is restored), and the application is allowed to perform a single step of execution. Following this, the application is again interrupted, to allow the pagepoint to be reinstated, thereby ensuring that further accesses to this page can be detected by the watchpoint. The application is then able to proceed once more.

Note that in making this single step, the processor instruction will generally either execute to completion or generate a synchronous interrupt. The latter indicates to the operating system that conditions were not correct for complete execution of the instruction, and prompts the processor to give control to an interrupt handler that attempts to resolve the problem. The instruction can then be re-executed if the problem is successfully resolved. A consequence of this is that if a watchpoint is used in an automated manner to generate a trace of watchpoint events, it may not be desirable to record multiple events for a single instruction that is re-executed due to some recoverable condition. To support this, in the preferred embodiment, the watchpoint handler is extended to provide two additional functions, watchpoint commit and watchpoint discard. The purpose of these additional functions is to respectively commit or discard trace information relating to the execution of a particular instruction. Effectively, watchpoint data is only committed when the instruction that triggered the watchpoint executes successfully.

Some known hardware breakpoint schemes can detect the type of access to a memory location (read/write or execute), and alter their response accordingly. In a preferred embodiment of the software watchpointing system of the present invention, this behaviour is emulated. In particular, the system page table for a memory page containing a watchpoint is modified such that a page fault interrupt is triggered only for certain types of access to said page. As an example of one way of doing this, a pagepoint can modify the writeable status of a page, rather than its presence status. In this configuration, a pagepoint will be triggered by a write access, but not by a read access.

There are a variety of mechanisms available to the skilled person for modifying the system paging facility as required by the present invention. In some situations, the source code may be available (e.g. for the Linux platform), and so the modifications can be made direct to the code. On the other hand, if the source code is not available, a typical mechanism for altering the paging function of the computer system is to modify the interrupt descriptor table, so that the code invoked responsive to a page fault interrupt is that required by the present invention, rather than the standard paging facility.

The invention further provides a computer system supporting the provision of watchpoints and including:

a system page table having a modified entry for a memory page containing a watchpoint, such that a page fault interrupt is triggered when said memory page is accessed;

a paging mechanism, modified so that responsive to a page fault interrupt, a determination is made as to whether said interrupt has been triggered by an access to a watchpoint; and a watchpoint handler, which receives control responsive to said determination that the interrupt has been triggered by access to a watchpoint.

The invention further provides a computer program for implementing the above methods. In particular, the computer program comprises instructions, which when loaded into a computer system, are executed to cause it to perform such methods. Note that the program instructions may be encoded onto a hardware medium such as a floppy disk, CD ROM, tape or DVD for loading into the computer, or transferred into the computer over a network connection, for example, via a modem or a local area network link. A further possibility is that the instructions are preloaded onto the computer system at manufacture, either onto the hard disk, or in ROM.

It will be appreciated that the computer system and computer program of the invention will generally benefit from the same preferred features as the method of the invention. Note also that the term computer system in this context should be interpreted broadly to cover any device capable of running the software programs described herein, whether a personal computer, server, mainframe, laptop, handheld device, WAP telephone or equivalent, or any other form of embedded system including the relevant computer functionality (which may possibly be utilised in a wide range of devices, such as television systems, automobiles, etc.).

BRIEF DESCRIPTION OF THE DRAWINGS

A preferred embodiment of the invention will now be described in detail by way of example only with reference to the following drawings:

FIG. 2A depicts a page table entry;

BRIEF DESCRIPTION OF THE DRAWINGS

The present invention is based on the utilisation of a system paging mechanism to provide watchpoints for debugging, probing or other purposes. In particular, pseudo page-faults (as discussed in more detail below) can be utilised as a mechanism for triggering watchpoints. A page which is marked for a pseudo-page fault on behalf of a watchpoint is referred to herein as a pagepoint. Implementations of this approach for a range of different environments will now be described.

Note that throughout the detailed discussion it is assumed that normal programming precautions are taken to ensure consistent results when accessing and updating certain components, such as the pagepoint manager structures and tables (as described below). A spinlock, semaphore or interrupt disablement will suffice for this purpose, depending on the environment of the embodiment. Where operating system page manager and pagepoint manager structures need to be accessed atomically then a consistent locking hierarchy must be established. The algorithms discussed below assume that pagepoint serialisation is performed before that of page management., and in particular the pagepoint serialisation is done on entry to each of the procedures described.

1) A Single-tasking Environment

There are three main aspects which need to be addressed in order to properly handle pagepoints:
(a) Tracking watchpoints and pagepoints: how they are recorded, activated and deactivated.
(b) Handling pseudo-page faults: how to distinguish true page faults from those due to the presence of a pagepoint (i.e. pseudo-page faults), and how to process the latter.
(c) Synchronisation with the page manager: how to ensure pagepoints are re-instated after paging operations.

A) Tracking Watchpoints and Pagepoints

Figure 2:
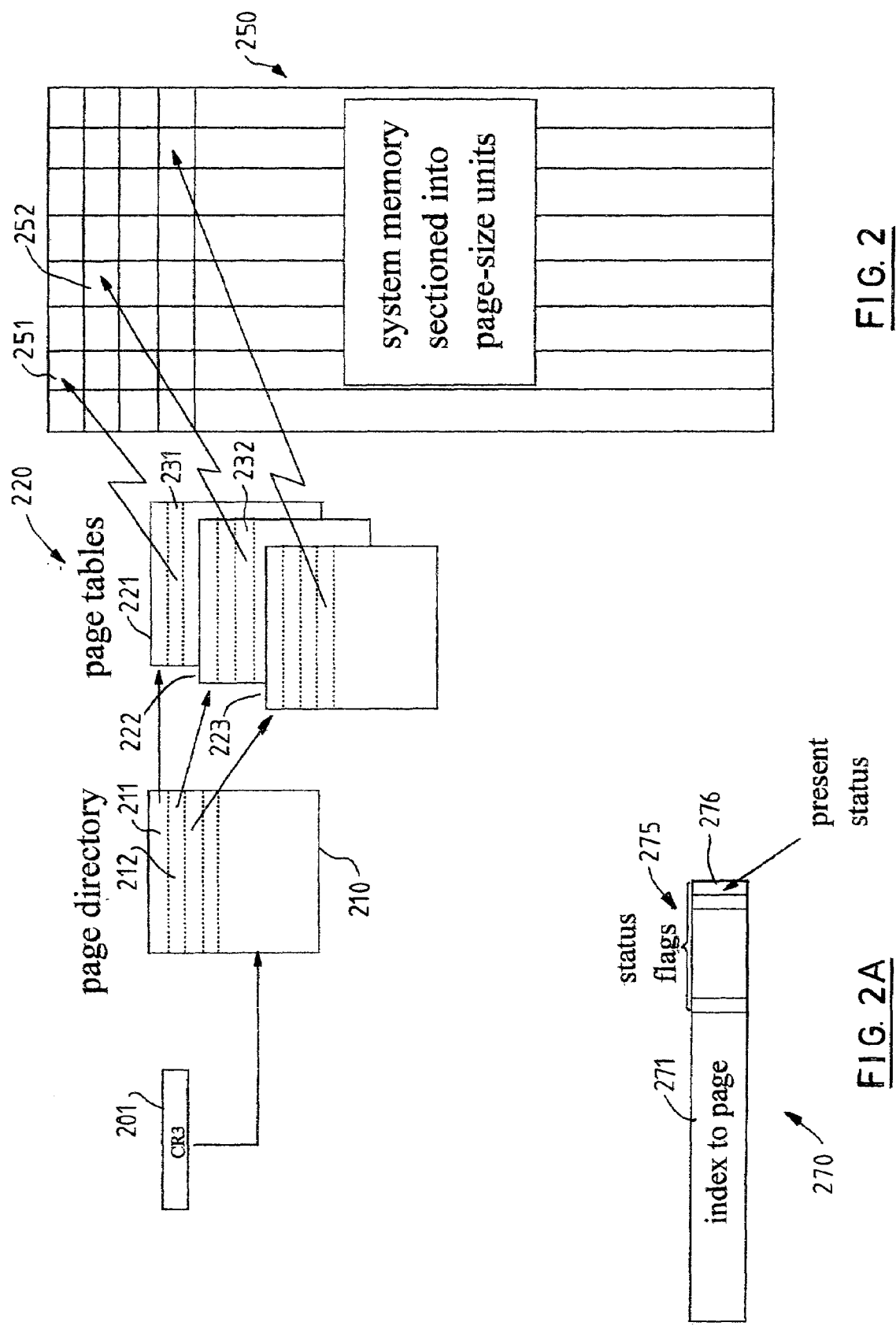
FIG. 2 illustrates a page table in a prior art system.
Figure 3:
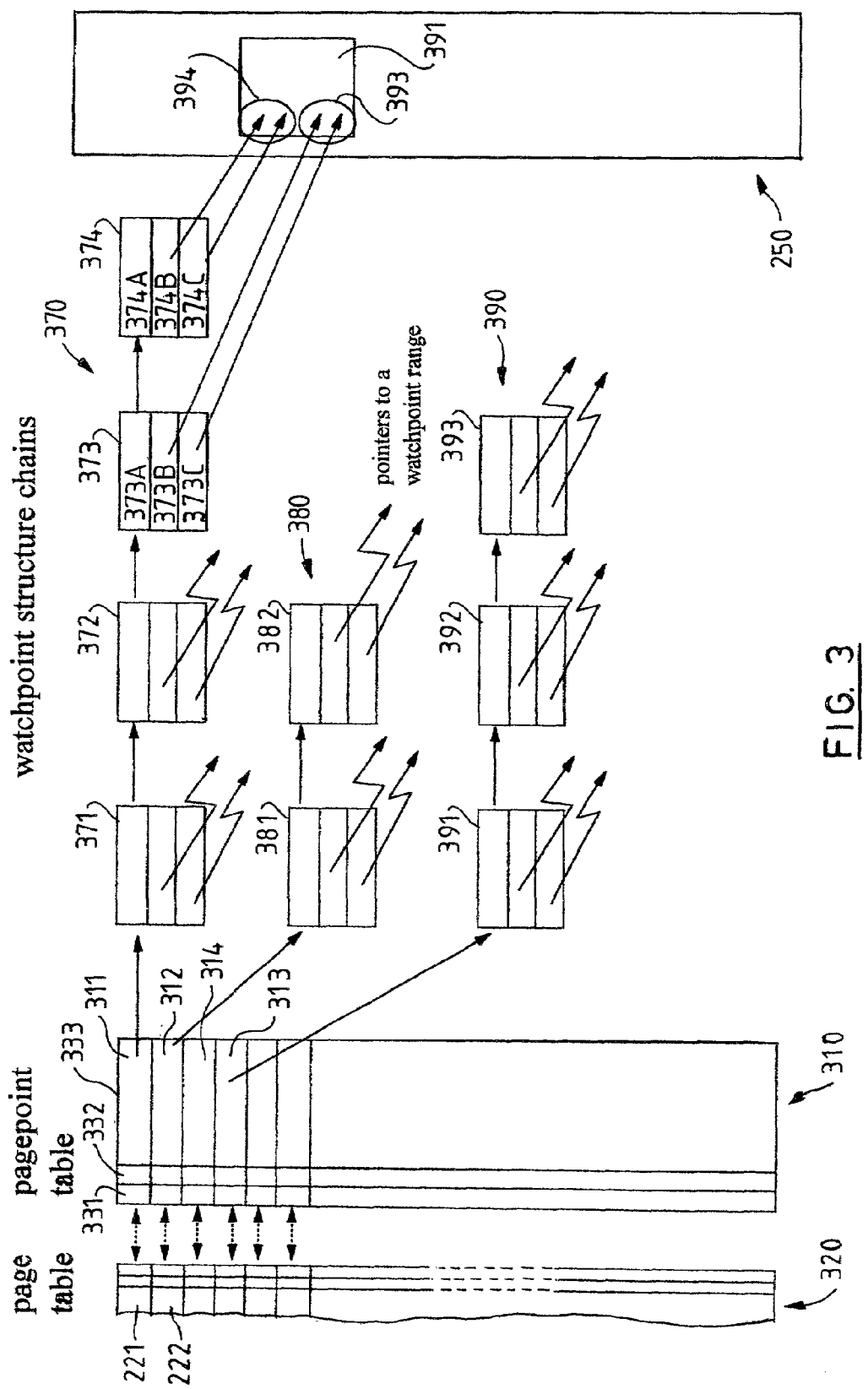
FIG. 3 illustrates the pagepoint table and watchpoint definition structures in a preferred embodiment of the present invention.

In order to implement pagepoints, the preferred embodiment utilises a pagepoint table, as shown in FIG. 3. The pagepoint table 310 contains one entry 311, 312, 313 per page of virtual storage. Also shown FIG. 3 is the page table 220, which, as previously discussed in relation to FIG. 2, likewise contains one entry 221, 222 per page of virtual storage.

Each entry in the pagepoint table contains at least three fields:
(1) a status flag 331 indicating whether a pagepoint is active for the corresponding page;
(2) a status flag 332 which is copy of the entry 276 (see FIG. 2A) in the page table entry for that page, which indicates the status of the corresponding page: i.e. whether or not the page is currently present in system memory 250; and
(3) a pointer 333 to a chain of watchpoint definition structures if the pagepoint is active (otherwise the value is undefined or null).

(Note that in some embodiments, the status flag could be replaced by a counter that indicates the number of appended watchpoint definition structures, or omitted altogether since its value can already be deduced from whether or not pointer 333 is null).

Each virtual page in FIG. 3 has a linked watchpoint chain 370, 380, 390. The number of watchpoint definition structures within a chain corresponds to the number of watchpoints set for that page. For example watchpoint chain 370 comprises four watchpoint definition structures 371, 372, 373, 374, whilst watchpoint chain 380 comprises two watchpoint definition structures 381, 382. If there are no watchpoints set for a page, the corresponding chain can be regarded as empty or non-existent (this is the case for the page associated with pagepoint table entry 314).

In the preferred embodiment, each watchpoint definition structure includes at least the following three fields:
(1) A pointer to the next watchpoint structure for this page (i.e. the next link in the chain)
(2) The beginning address of the watchpoint within the page
(3) The end address of the watchpoint, or equivalently the size of the watchpoint range.

Referring to FIG. 3, watchpoint definition structure 373 therefore includes a first field 373A that points to the next watchpoint definition structure 374 in the chain 370 associated with page 391. The second and third fields 373B, 373C in watchpoint definition structure 373 then identify the start and end locations of a region 393 within page 391. Watchpoint 373 is triggered by any access to memory region 393.

Likewise, watchpoint definition structure 374 includes second and third fields 374B, 374C that identify the start and end locations of a region 394 within the same page 391 (since structures 373 and 374 are part of the same chain 370). Watchpoint 374 is triggered by any access to memory region 394. (Note that since structure 374 is the end of the chain for pagepoint entry 311, field 374A may be null, or have some other suitable housekeeping value).

It will be appreciated that watchpoint definition structures 371 and 372 also define watchpoint ranges (not shown) within page 391, since they are part of the same chain 370 as structures 373 and 374. On the other hand, watchpoint definition structures 381 and 382 define watchpoint ranges in a different page (not shown in FIG. 3). Likewise, structures 391, 392, 393 in chain 390 will define watchpoint ranges in a third page of memory (again, not shown).

A determination can therefore be made as to whether a given memory address is covered by a watchpoint by first locating the entry 221 in the page table for the page which includes the address. From here the corresponding pagepoint table entry 311 for the page can be located, and in turn flag 331 examined. If this flag is set, this indicates that there is at least one active pagepoint for this page. If flag 331 is indeed set, then pointer 333 can be used to identify the corresponding chain 370 of watchpoint definition structures. The first field in each definition structure can then be used to navigate down the chain. This allows the memory address in question to be tested against the second and third fields in each definition structure to determine whether or not the address falls within the range covered by that structure, and therefore whether or not a watchpoint is to be triggered.

It will be appreciated that a watchpoint definition structure may be extended with addition information, depending upon the requirements of a particular embodiment. For example, in some circumstances it may be desirable for watchpoint-specific handlers to gain control when a pseudo-page fault interrupt occurs.

Figure 4:
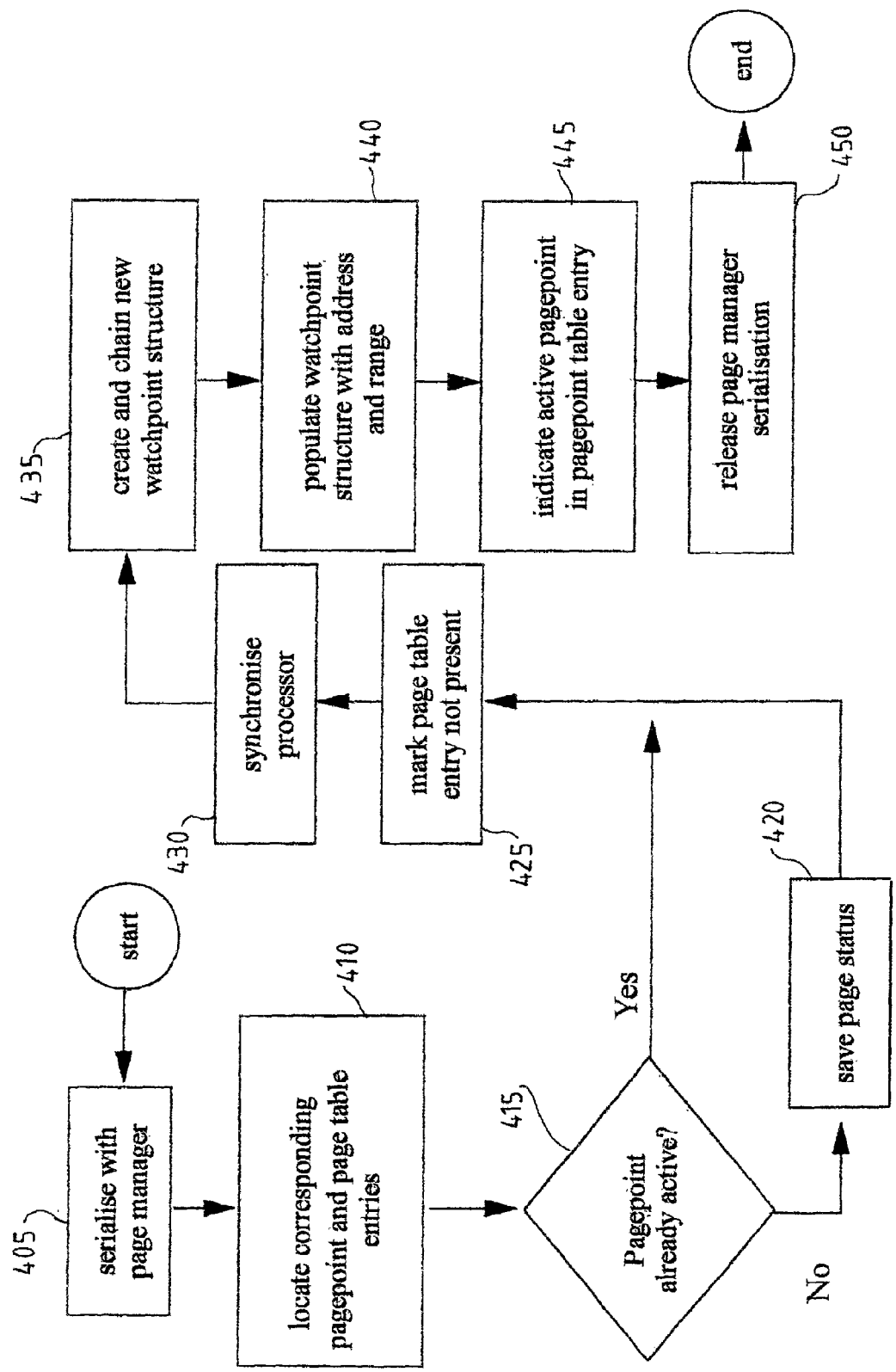
FIG. 4 illustrates the activation of a watchpoint according to a preferred embodiment of the invention.

FIG. 4 illustrates the overall mechanism which is used in order to initially activate a pagepoint (i.e. a watchpoint implemented so as to be triggered by the paging mechanism). The first step 405 is to serialise page manager activity, which is essentially a matter of disabling interrupts using the appropriate machine instruction. This avoids the possibility of an error which might otherwise arise, for example if a page fault occurred whilst a watchpoint was in the process of being activated.

The next step is to locate the corresponding pagepoint and page table entries for the new watchpoint (step 410). In practice this involves using the watchpoint address to form an index into the respective tables. A test is now made (step 415) to determine whether or not there is already an active watchpoint in this page, in other words to see if the watchpoint definition structure chain contains any entries. This test can be performed by looking at the status of flag 331 in the pagepoint table (see FIG. 3). If there are currently no pagepoints active for this page, then the setting of the flag in page table entry that indicates whether or not the page is present in system memory is saved into the corresponding entry in the pagepoint table (step 420). In other words, the setting of flag 276 (see FIG. 2) in the page table is copied to the corresponding flag 332 (see FIG. 3) in the pagepoint table. On the other hand, if the test of step 415 is positive (i.e. there is already at least one pagepoint active for this page), then step 420 can be bypassed. The reason for this is simply that the presence status will already have been copied into the pagepoint table when the first pagepoint for that page was set up.

The method now proceeds to step 425, in which the relevant page has its status in the page table set to not present (i.e. not in system memory). Thus flag 276 (FIG. 2A) is set to its negative value. The consequence of this is that a page fault will always occur when the program accesses a page with an active watchpoint. Note that such automatic page faults are termed pseudo-page faults herein, since they do not necessarily indicate that the requested page is actually outside system memory.

As explained earlier, for performance reasons processors typically cache a portion of the page table in the TLB. The next step (430) is therefore to synchronise the processor by purging at least the TLB entry corresponding to the page in question, or the entire TLB if there is no facility to manipulate individual TLB entries. This ensures that the TLB contains an updated page table, containing the modified presence information.

The method is now able to update the watchpoint chain structure to reflect the new watchpoint (step 435). This involves adding a watchpoint definition structure to the end of the chain for the page. If this is the first watchpoint for the page, then there will only be a single entry in the new chain; alternatively, if there is at least one existing watchpoint definition structure, the new structure must be added to the end of the existing chain. This is accomplished by updating the forward pointer for the structure currently at the end of the chain, so that it points to the new structure. As an example of this, prior to the addition of watchpoint 374 in FIG. 3, pointer 373A in the immediately preceding structure would be null. Then, when structure 374 is added to the chain, pointer 373A must be updated to point to this new structure (to give the situation shown in FIG. 3).

Adding the watchpoint to the chain is followed by populating the watchpoint definition structure with position information (step 440), to indicate the range within the page that will trigger this watchpoint. Referring again to structure 374 in FIG. 3, this effectively represents populating fields 374B and 374B with start location and end location (or size) respectively.

The method then proceeds to step 445, which updates flag 331 in the pagepoint table to indicate that there is an active pagepoint for this page. Of course, this flag will already have been set if all we have done is to add a new watchpoint structure at the end of an existing chain. In other words, if there is already at least one active pagepoint for this page, then flag 331 will have been set earlier when this previous pagepoint was activated.

Finally in FIG. 4, the page manager serialisation is released (step 450). This counters the earlier serialisation performed at step 405, and effectively permits the resumption of interrupts.

Figure 5:
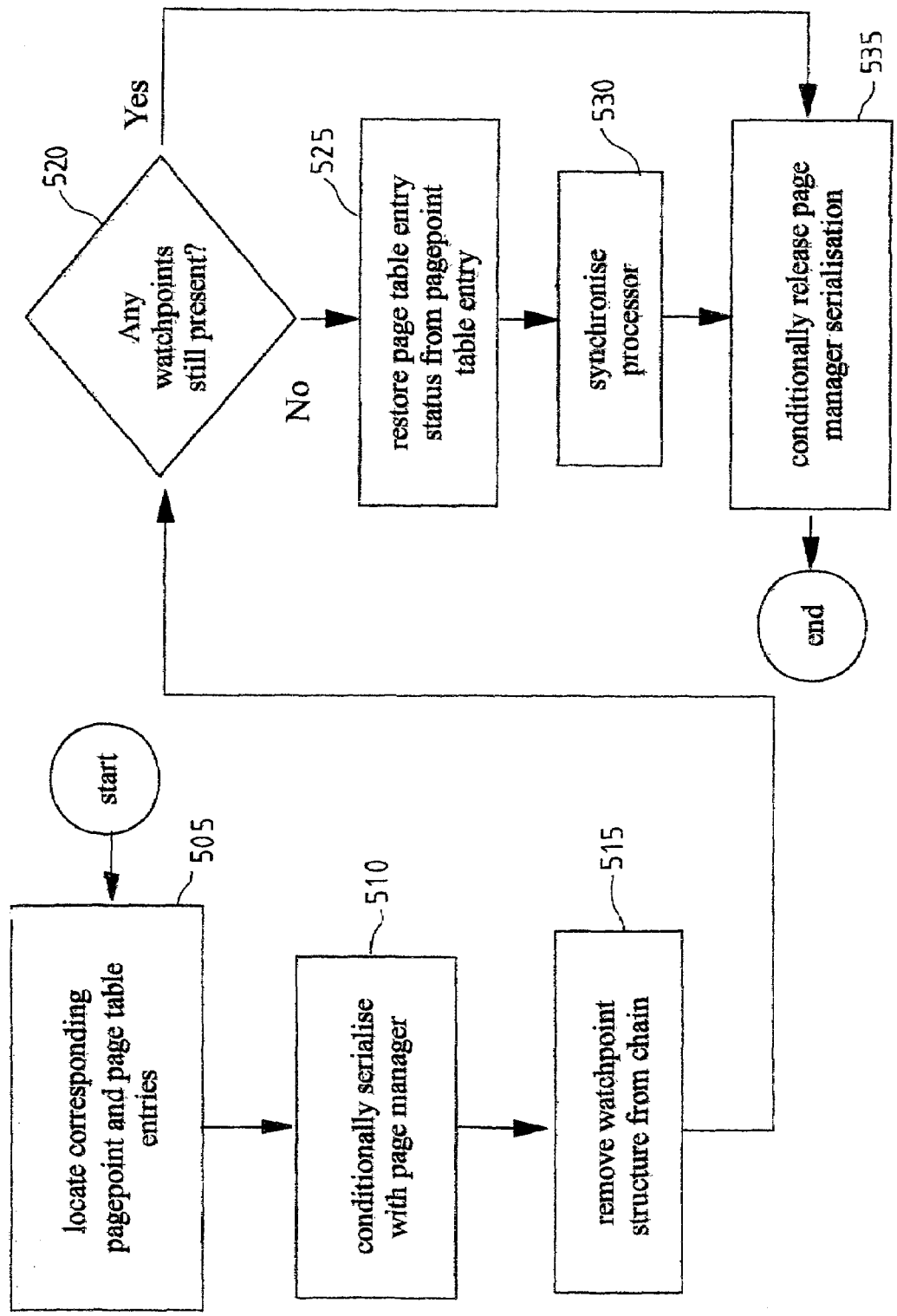
FIG. 5 illustrates the de-activation of a watchpoint according to a preferred embodiment of the invention.

FIG. 5 illustrates the deactivation of a watchpoint, which is largely the converse of the method of FIG. 4. The process commences with a look up the page table and pagepoint table entries for the page containing the breakpoint being deactivated (step 505). This is followed by the conditional step of serialising the page manager (step 510); as in FIG. 4, this is to prevent interrupts. Note that this serialisation is only conditional, in that it does not need to be performed if there is more than one watchpoint set for this page, for reasons that are explained below. The method now proceeds to remove the watchpoint definition structure from the chain, (step 515) including any concomitant changes required to the pagepoint table and/or other watchpoint definition structures.

At step 520, a test is performed to determine if there are any watchpoints still present on this page. If so, then the method can terminate directly. On the other hand, if the test of step 520 is negative, then the page table presence status is restored from the pagepoint table back to the page table (step 525). In other words, field 332 of the pagepoint table (FIG. 3) is copied back to field 276 of the page table (FIG. 2A). This is because with no more watchpoints active for that page, the pagepoint handling does not need to be specially invoked, and so the page table can be updated accordingly.

It will be appreciated that the test of step 520 is essentially the same as whether or not to serialise the page manager in step 510, since the latter is only required if the page table is being updated. Once such an update has been performed at step 525, (re)synchronisation must be performed with the processor (step 530), to appropriately renew the TLB. Finally, the serialisation of the page manager can be released (step 535), once the updates to the page table and TLB cache version of it have been completed.

B) Handling Pseudo-page-faults

Figure 1:
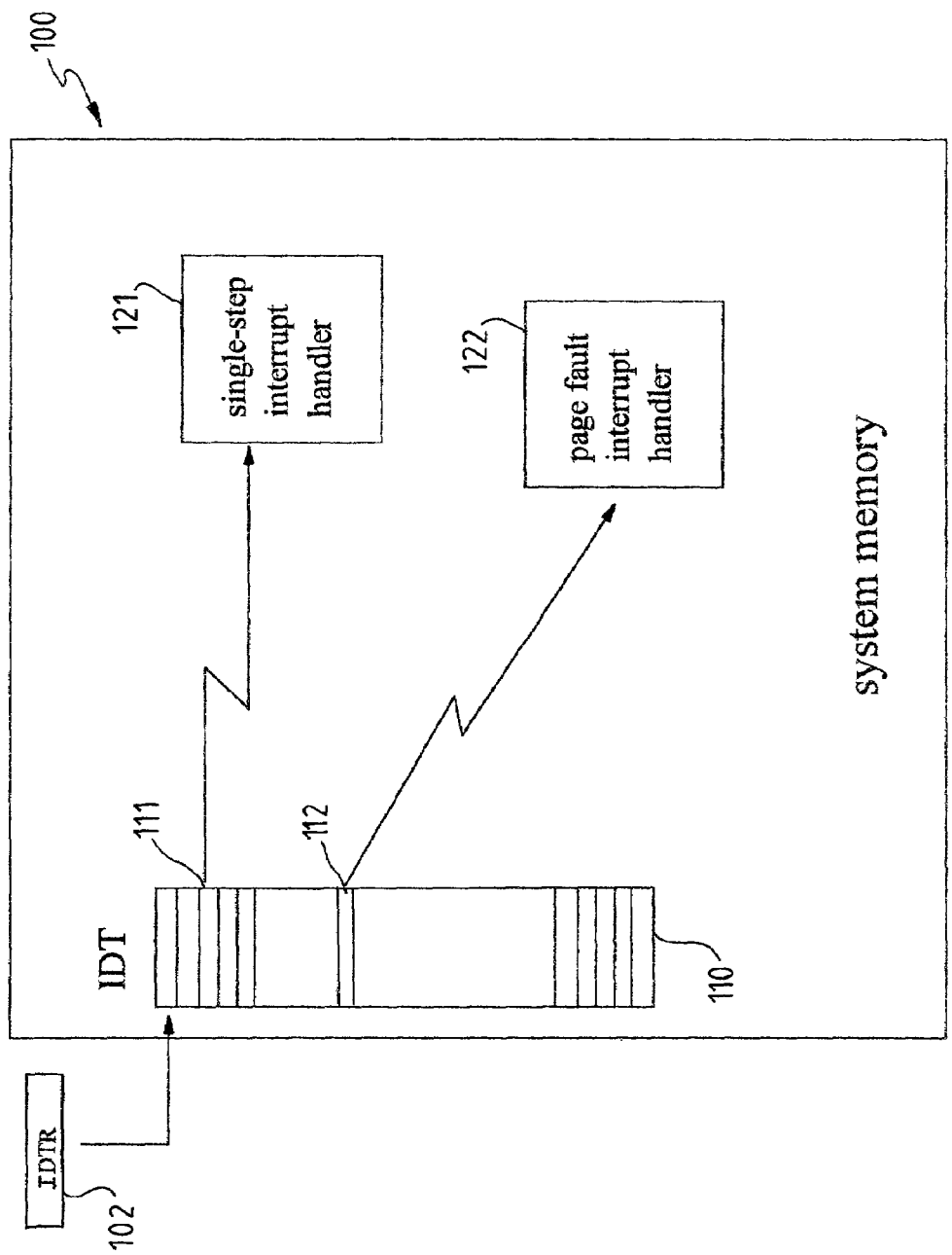
FIG. 1 illustrates the invocation of interrupt handlers in a prior art system.

Having now discussed the activation and deactivation of pagepoints, we are now in a position to discuss how they are handled by the system. In particular, the operating system's page fault handler needs to be extended with a function that manages distinguishes and manages pseudo-page-faults (i.e. those generated by a pagepoint). The exact manner of this updating will be platform specific. For example, in an open-source environment such as Linux, the standard operating system page-fault handler may be readily extended because of the availability of the source code. Alternatively, in a closed-source environment such as the OS/2 operating system from IBM Corporation that runs under the IA32 architecture, the IDT can be updated (see FIG. 1), so that the reference to the page fault interrupt handler (122 in FIG. 1) is replaced by a reference to the pseudo-page fault interrupt handler.

Note that that in this section we do not explicitly mention the need to serialise the page manager, because most page managers will be implemented so as not to permit the state of the paging system to be disturbed while handling a page fault. If this is not the case with a particular embodiment then additional serialisation steps must be added to these procedures described herein.

Figure 6:
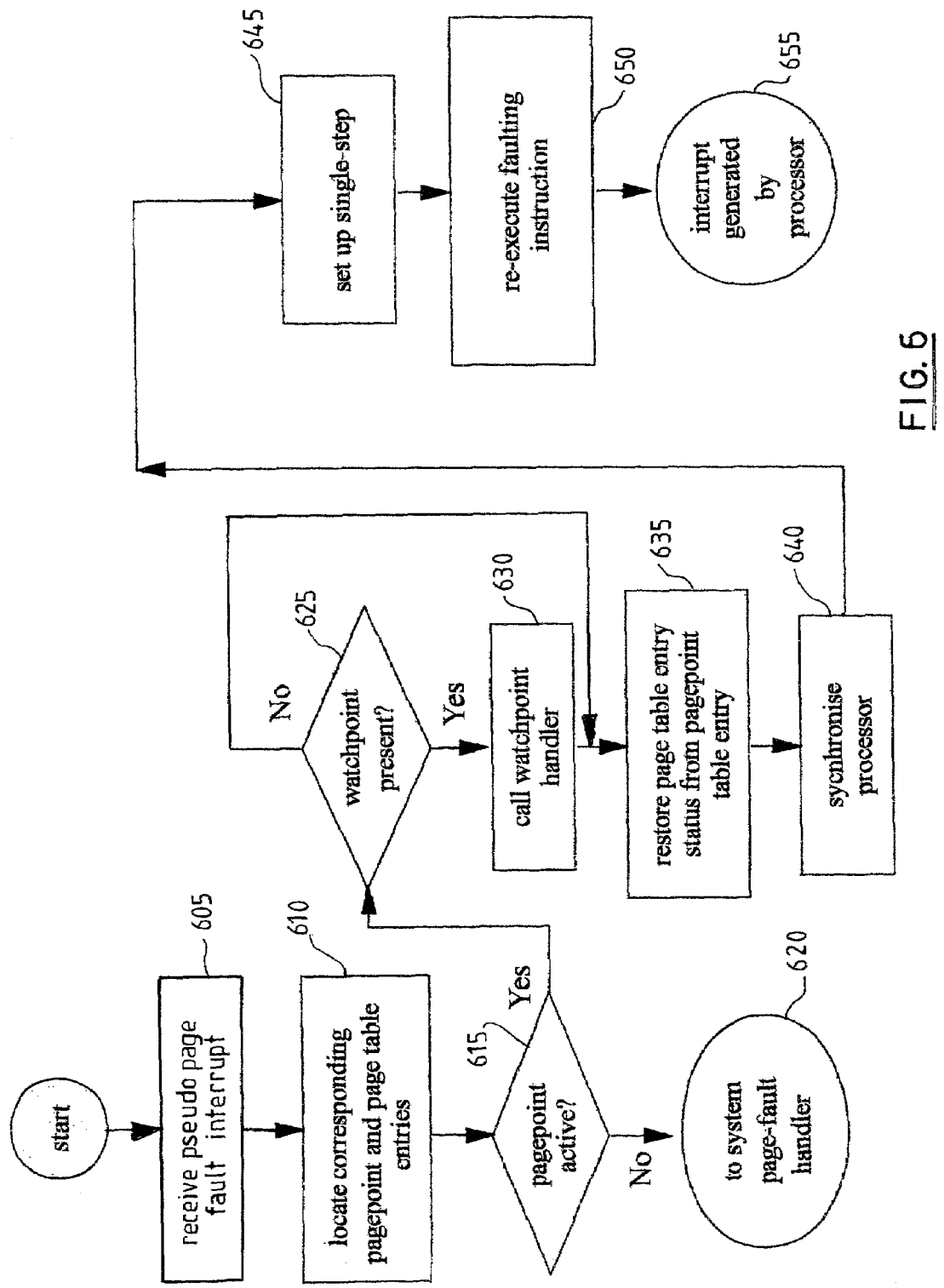
FIG. 6 illustrates the handling of a pseudo page fault in a preferred embodiment of the invention.

The operation of the modified (pseudo) page-fault handler is illustrated in FIG. 6), and commences with receipt of a page fault (step 605). The corresponding entries in the page table and pagepoint table are located (step 610), based on the memory address that triggered the page fault. A determination is now made as to whether there is actually a pagepoint active for this page (step 615); if not, then the page fault is simply being triggered because the requested page is not in memory, and so the normal paging mechanism can now be employed to retrieve the requested page (step 620).

Next a test is performed to see whether the triggering address is actually within a watchpoint. Referring back to FIG. 3, it can be seen that pagepoints are (essentially by definition) set at the granularity of individual pages, e.g. page 391. However, a watchpoint (or watchpoints) may only be defined for certain addresses within this page, e.g. ranges 393 and 394. If a watchpoint does exist for this fault address then the watchpoint handler is called (step 630); the precise function of this will vary according to particular user requirements, but typically it may be used to output tracing information.

Once the watchpoint handler has completed (or directly if there is no watchpoint), the present/not-present status for this page from the original page-table (i.e. as copied from field 276 in FIG. 2A into field 332 in FIG. 3) is restored (step 635) back to the page table (i.e. copied back from field 332 to field 276). This is necessary for the interrupted program to be able to proceed properly, since it needs to know whether or not the requested page really is in memory, or whether it must be retrieved from disk storage. The processor is then synchronised in order to propagate the updated page table (step 640) into the TLB.

The method now proceeds to set up a single-step operation of the instruction that triggered the pagepoint (step 645). The current interrupt enablement state must be noted and restored after single-step if the instruction does not modify the state. This information can be saved in any convenient memory location that is accessible at all times. The purpose of the single-stepping is to ensure that the pagepoint can be subsequently reactivated. Note that it is currently deactivated (by temporarily storing the correct presence information in the page table) in order for the original instruction to properly proceed.

Thus the original instruction that triggered the pagepoint is allowed to execute in single-step mode (step 650). This will be followed by a further interrupt (step 655), which can arise from one of two possibilities: either the single-step instruction may execute to completion and then present a single-step interrupt or it may execute partially or not at all and generate an exception (for some error condition).

Figure 7:
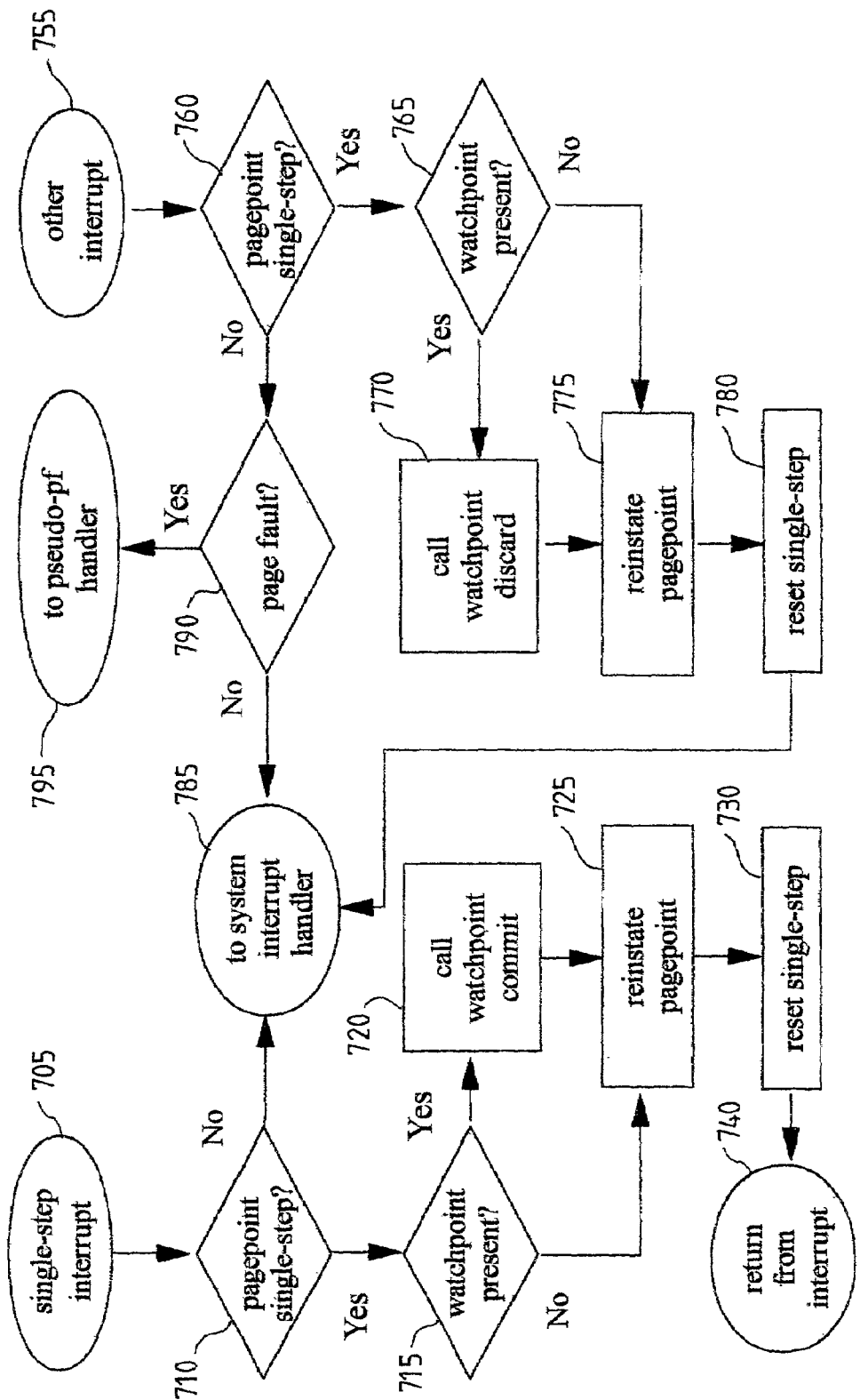
FIG. 7 illustrates the processing of a single step interrupt in a preferred embodiment of the invention.

The details of the single-step handling are illustrated in FIG. 7. Considering first the receipt of a single step interrupt (step 705), a determination is made as to whether a pagepoint is being processed (step 710). If not then the single-step interrupt has arisen in some other context, and can be passed (step 785) to the system interrupt handler. However, assuming that we are tracking a pagepoint, then the next step is to determine whether or not there is a watchpoint present (step 715)—this is known from the outcome of step 625 in FIG. 6. If so, the watchpoint commit function can be called (step 720), the purpose of which will be described below. Once this has completed, or alternatively if there is no watchpoint present, then the method proceeds to reinstate the pagepoint (step 725). Thus it will be recalled that the pagepoint had effectively been deactivated at step 635, by restoring the page table presence information from the pagepoint table. Thus reinstatement can be accomplished by resetting the presence information 276 in the page table to again indicate that the page is missing from memory. Finally, the single-step 730 status can be terminated, allowing the interrupted program to continue normally after return from the interrupt (step 740).

Turning now to the situation where a different interrupt is received (step 755) (i.e. not a single step), then again a test is made to see if a pagepoint is being processed (step 760). If this is not the case, then if the interrupt is due to a (pseudo) page fault (step 790), the pseudo page fault handler will be invoked (step 795), in other words, taking us into to the processing of FIG. 6; alternatively, if the interrupt has some other cause apart from a page fault, then the system interrupt handler is invoked (step 785).

Returning now to step 760, if we are in pagepoint single-step, then it is next determined whether or not a watchpoint is present (step 765)—again this will be based on the outcome of step 625. If a watchpoint is indeed present, then in the preferred embodiment, a watchpoint discard function is called (step 770), whose purpose will be described in more detail below. Once this has been completed, or directly if there is no watchpoint, then the pagepoint can be reinstated (step 775) and single step reset (step 780), mirroring the operations performed in steps 725 and 730. However, on completion of step 775 and step 780, control is passed to the system interrupt handler (step 750), rather than returned to the original program, since it is still necessary to clear whatever generated the interrupt at step 755.

The reason for this difference is that an instruction might fail for multiple reasons, all of which are recoverable, and it may well be re-executed more than once. The strategy described above is effective even with multiple retries. Thus when some other form of interrupt is presented at step 755 after setting up the single-step, execution is allowed to continue at step 750 with the operating system's interrupt handler (there may be a number of specific handlers which we have to distinguish). If the instruction is subsequently retried and the error condition is corrected, then because the pagepoint was reactivated at step 775, a pseudo-page-fault will again be generated. However, this time on single-stepping, since the error has been cleared, the instruction will pass through to a single-step interrupt (step 705), which will ultimately allow continuation of the original program (step 740).

It is in this context of the same instruction being re-executed potentially multiple times that the watchpoint commit and discard functions are provided, since it may not be desirable to repeatedly collect essentially the same trace information each time a pagepointed instruction fails. Thus in one preferred embodiment, watchpoint information is provisionally written by the watchpoint handler at step 630. However, if the single step does not complete (i.e. it is interrupted at step 755), then this information is discarded at step 770 by the watchpoint discard function. The trace information is then regenerated when the reactivated pagepoint is again triggered for this instruction, but will be discarded again unless the single step completes, in other words the instruction is successful. In this latter case the watchpoint commit function (step 720) serves to confirm the provisional trace information.

It will be appreciated that this use of watchpoint commit and discard is generally convenient for a user, but may not be appropriate in all circumstances. For example, in some circumstances, it may be desirable to collect all trace information for both successful and failed attempts at an instruction. In this case, the watchpoint commit and discard functions are not needed, since the trace information can be securely output at step 630.

Figure 8:
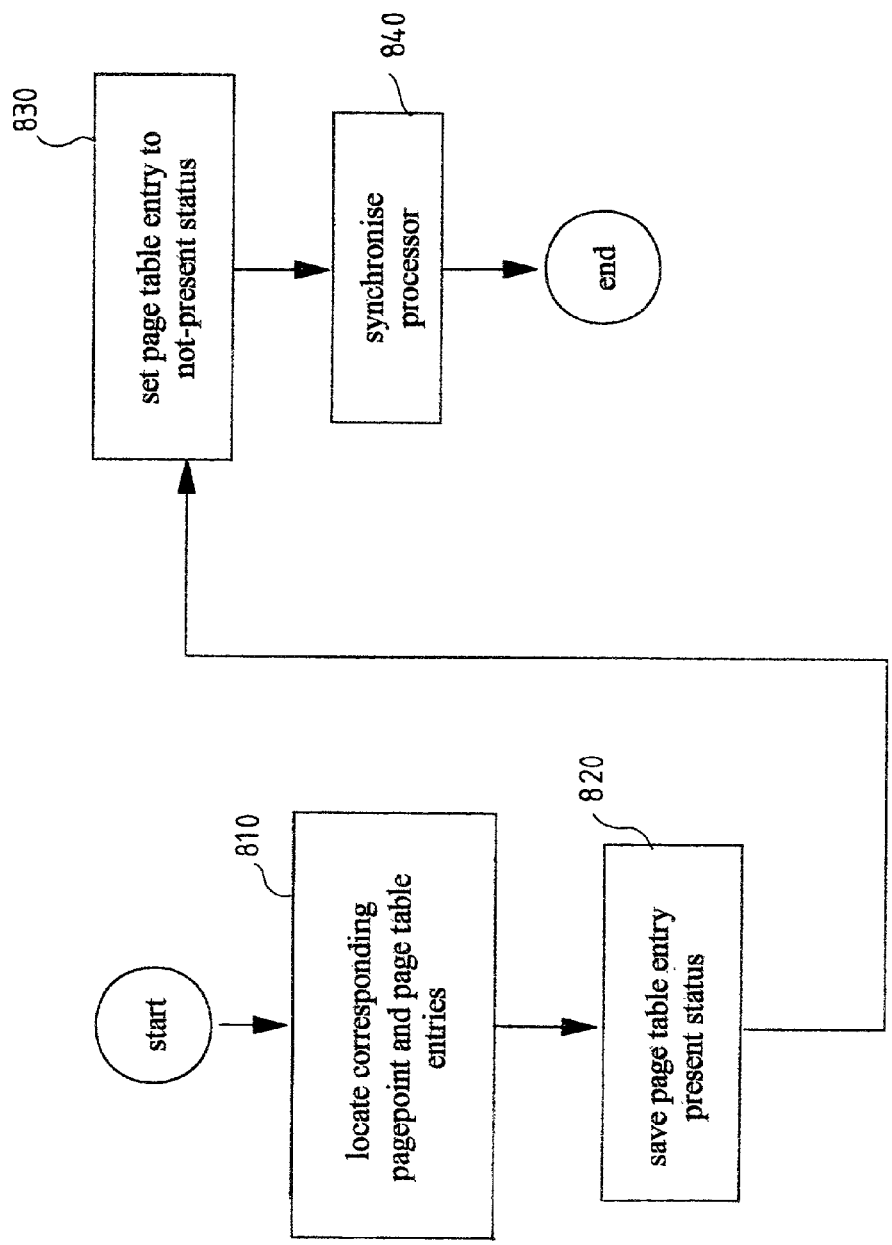
FIG. 8 illustrates in more detail the reinstatement of a pagepoint from the processing of FIG. 7.

FIG. 8 illustrates in more detail the operations performed to reinstate a pagepoint after the single-step process (i.e. corresponding to steps 725 and 775 in FIG. 7). The process first involves locating the pagepoint table and page table entries associated with the relevant pagepoint (step 810), and copying the saved page table entry present/not-present status into the pagepoint table entry (field 332) from the page table entry (field 276) (step 820). The page table entry status is now set to not-present (step 830), which effectively re-instates the pagepoint (step 830), and the processor's TLB is resynchronised to the new page table data (step 840). It will be appreciated that this process is analogous to the corresponding portions of FIG. 4, illustrating the initial activation of a pagepoint.

Figure 9:
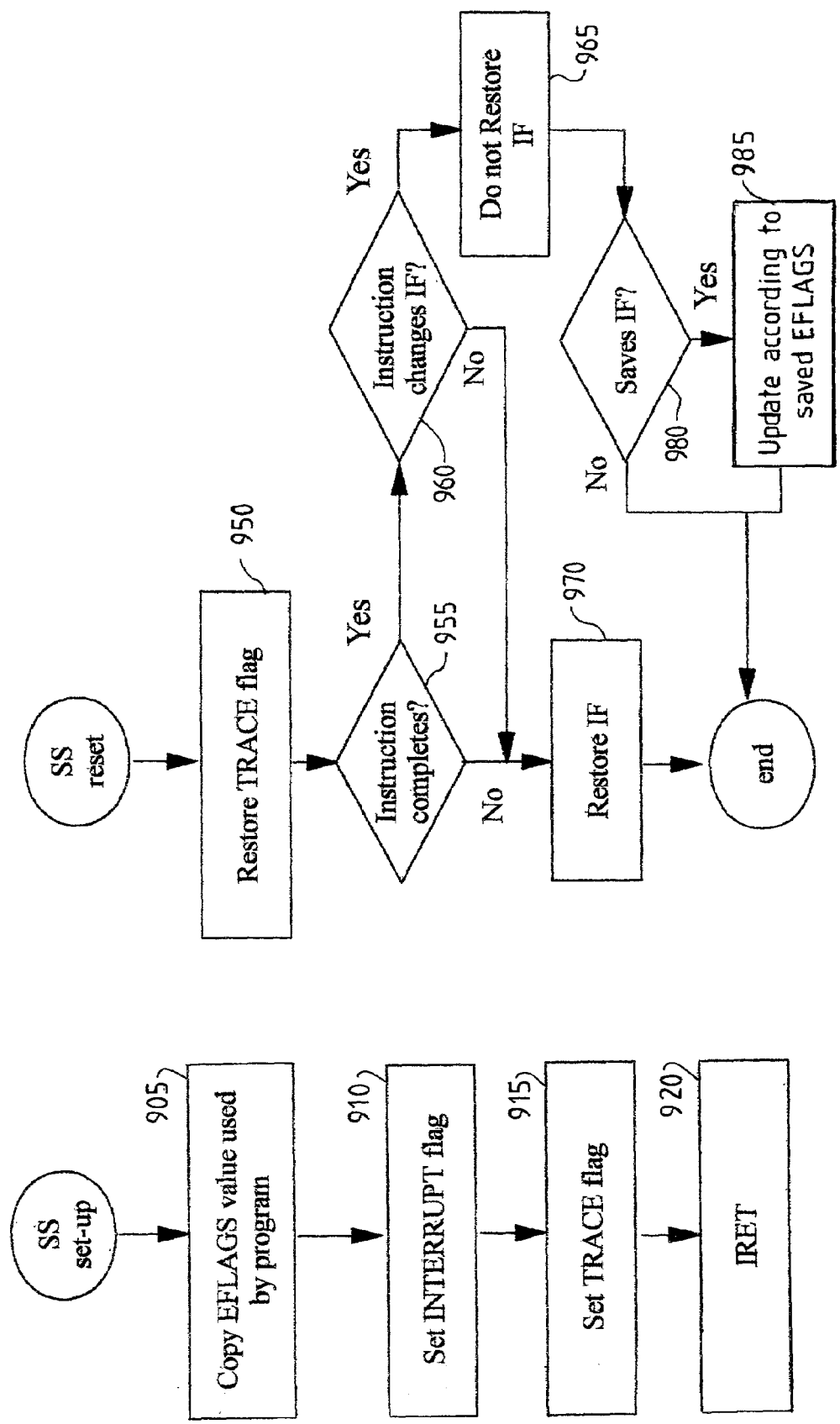
FIGS. 9A and 9B illustrate in more detail the setting and resetting respectively of single step from the processing of FIGS. 6 and 7.

FIG. 9 illustrates in more detail how to set up and reset single-stepping, as implemented on the IA32 architecture (the skilled person will be aware how to achieve similar functionality on other platforms, albeit that somewhat different mechanisms may be utilised). More particularly, FIG. 9A depicts setting up single step, as per step 645 of FIG. 6, whilst FIG. 9B depicts resetting (terminating) single step, as per steps 730 and 780 of FIG. 7).

Referring first to FIG. 9A, the single-step must be performed with I/O interrupts disabled for two reasons: (i) the pagepoint is deactivated for the single step. If an I/O interrupt were permitted, then a watchpoint might be missed if the I/O interrupt handler attempted to access that page; and (ii) it may not be possible to guarantee saving status across the single-step—some form of stack, but complications arise if the stack fills. Accordingly, before the single-step is performed, the original EFLAGS value is saved so that subsequently the INTERRUPT flag (and the TRACE flag) can be restored correctly (step 905). In addition, to ensure that the single-step completes with interrupt disabled (step 910), the type of entry in the IDT is set to be an Interrupt Gate—this is a device under IA32 to guarantee an interrupt handler starts execution with interrupts disabled. Other architectures offer equivalent mechanisms.

The single-stepping itself can now be invoked by setting the TRACE flag (step 915) and then the Extended Flags Register (EFLAGS). The IRET instruction is employed (step 920) to simultaneously load a new value in EFLAGS and return to the instruction we wish to single-step.

Resetting the single-step is shown in FIG. 9B, and commences with the restoration of the TRACE flag from the saved EFLAGS (step 950). If the instruction has completed (step 955) without modification of the INTERRUPT flag (tested at step 960) then the value of the INTERRUPT flag can be restored from the saved EFLAGS (step 970) (the same also applies if the instruction does not complete, but ends instead with another interrupt).

On the other hand, if the instruction completes and does modify the INTERRUPT flag then the value of the INTERRUPT flags from the saved EFLAGS is not restored (step 980). Rather, a determination is made as to whether the instruction has saved the modified INTERRUPT flag (step 980), and if so, then this saved value is modified in accordance with the saved EFLAGS value (step 985), before the method finally exits.

C) Synchronising with the Page Manager

The pagepoint manager intercepts page manager operations when it updates the status of a page table entry in order to make the corresponding update to the pagepoint table entry. Specifically this occurs when a page-in or page-out operation is performed. (The page manager may perform intermediate steps for a page-out operation. These do not concern us, only the point at which the page table entry is updated is of interest).

2) A Single Processor, Multi-tasking Environment

A multi-tasking environment has additional complexity, which arises because part or all of the page table entries may be either refreshed or switched to a new set when a task switch (sometime referred to as a process switch) occurs. This forces pagepoints to be managed on a per-task basis, if watchpoints are to be defined as being task specific. This requires the pagepoint manager to maintain a set of entries per-task as is done by the page manager.

Figure 10:
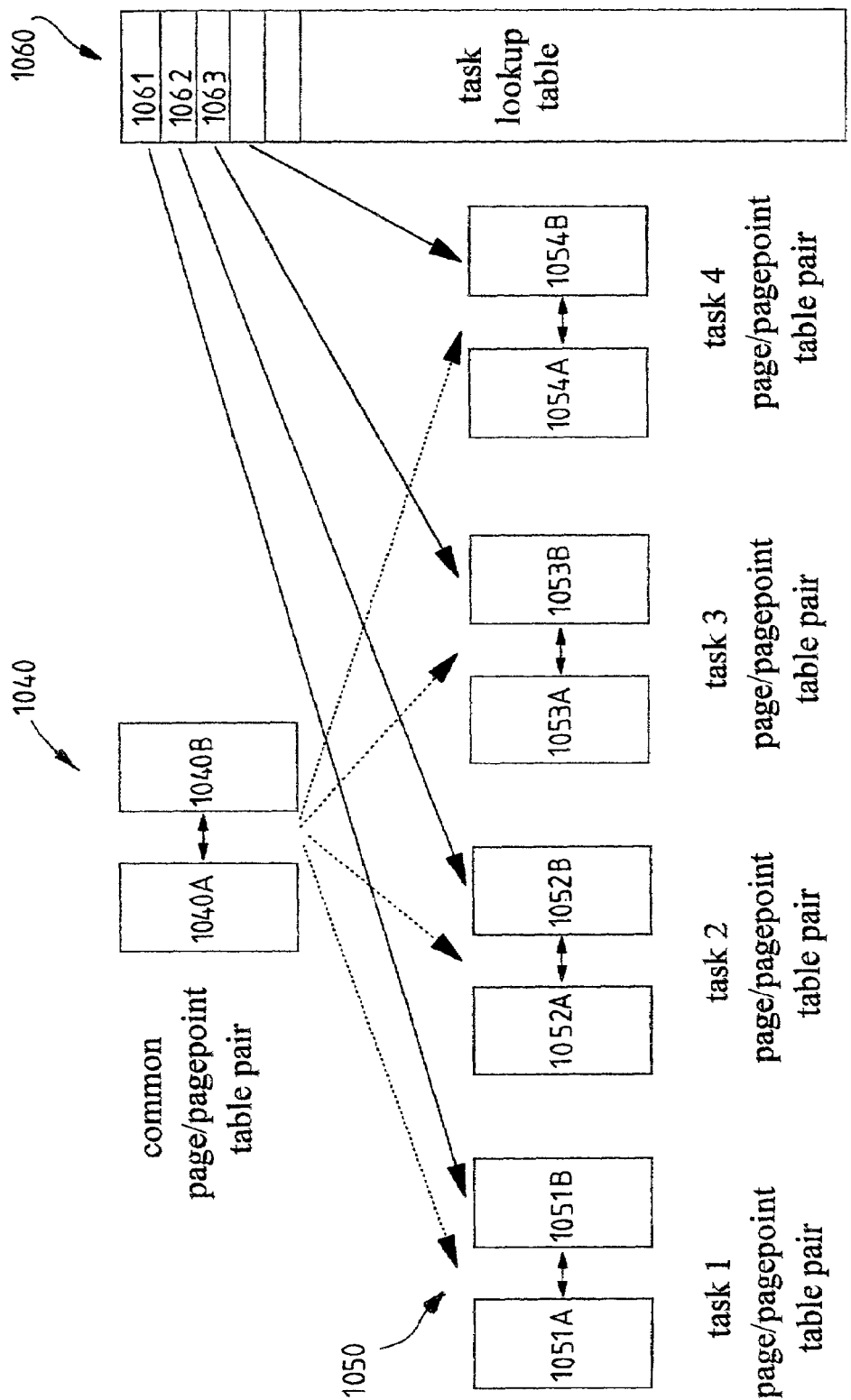
FIG. 10 illustrates the handling of task-specific pagepoints in a preferred embodiment of the invention.

FIG. 10 illustrates a typical scheme in one preferred embodiment, where a subset of the page table entries are common to all tasks (usually memory occupied by the operating system) with the remaining entries specific to each task. A mechanism must be provided to correlate a task to its task-specific pagepoint table. One simple method, as illustrated in FIG. 10, is to use a lookup table that is indexed by the task identifier (it is invariably the case the tasks are identified by a unique number).

Thus looking at FIG. 10 in more detail, there is a common page/pagepoint table pair 1040 (the page table is 1040A, the pagepoint table 1040B). These are common across all tasks. These tables are effectively extended by the task-specific page/pagepoint tables 1050, with one such task-specific pairing being provided for each task. The pairing for a particular task can be located from lookup table 1060, which is indexed by task number to provide a reference to the corresponding pairing of page and pagepoint tables. For example, entry 1061 in lookup table references page table 1051A and pagepoint table 1051B for task 1, whilst entry 1062 references page table 1052A and pagepoint table 1052B for task 2.

Note that since processor watchpoints themselves are not task-specific, a strict generalisation from processor watchpoints to pagepoint-implemented watchpoints does not require the provision of watchpoints on a task-specific basis. However, processor watchpoints are frequently made task-specific by saving and restoring task-specific watchpoint information during a task switch. It will be appreciated that this indicates the general need for task-specific watchpoints, and accordingly the task-specific nature of pagepoints as implemented herein is a useful enhancement.

In a multi-tasking environment, the pagepoint manager must be able to determine which task is currently active. This can be done by using the same mechanisms that the operating system employs (and so will necessarily be operating system specific). For example, in an OS/2 implementation, the current task (or process) and its associated copies of page table entries may be determined from the system variable _pPTDA. Alternatively, in a Linux embodiment, the same information may be determined from the system variable current. The skilled person will be aware of corresponding mechanisms that can be employed on other platforms.

The page manager typically uses one of two methods to ensure the correct page tables entries are used by the processor after a task switch. In the first method, referred to as a page table switch, the entire set of page tables is switched and no individual editing of page table entries takes place. This is usually achieved by loading a special register that points to the tables. Linux page management operates with this design criterion: under IA32, the Control Register 3 (CR3) is used to point to the new set of page tables. Since no page table editing is performed for a task switch the pagepoint manager does not have to take specific actions to support the task switch (this applies under Linux).

The alternative approach is where page table entries are edited (irrespective of whether or not a page table switch also occurs). The fact that individual page table entries are edited during a task switch requires the page manager to maintain information per table entry from which the editing is done—we refer to these sources as shadow page table entries. This method is used under OS/2. The existence of such shadow page table entries requires further involvement from the pagepoint manager.

In particular, the operating system's page manager must maintain its shadow page tables. This may be done either when a new task is to be made active, by coping the current values of the page table entries back to the shadow table entries, or else piecemeal, whenever a page table entry is changed during page-in and page-out operations.

The pagepoint manager therefore has two options for ensuring that pagepoints for the new task are correctly re-instated after a page switch. The first strategy is to maintain shadow entries in tandem with the page manager. Thus whenever the page manager updates its shadow page table entries, the pagepoint manager overrides the update to be consistent with the page table entry, if there is an active pagepoint. This requires that the page manager processing can be intercepted at points after such updates are made to the shadow entries. This also requires that the activation of a pagepoint marks the shadow page table entry status as not-present as well as the actual page table entry. Although this method is achievable, it is dependent on intercepting every instance of the operating system's use of the shadow page table entries and can require multiple intrusions into normal page management processing. It would therefore be highly specific to the operating system of the relevant embodiment.

An alternative mechanism is not to update shadow page table entries, but rather to intercept the processing in the operating system after a task switch has occurred. At this point selected page table entries can be updated, according to whether or not a pagepoint is active, and the original page table entry status is saved in the corresponding pagepoint table entry. This can be performed efficiently if for each process the pagepoint manager maintains a status indictor that determines whether any pagepoints are active in a task. The overhead to task switching would thus be negligible for those tasks with no pagepoints defined.

Note that where task-specific watchpoints are implemented, the pagepoint manager also needs to gain control at task termination to remove any remaining task-specific pagepoint tables entries and watchpoint structures. This can be performed in essentially analogous fashion to that employed for task switching at task commencement.

3) A Multi-Processor, Multi-tasking Environment

There are two additional considerations in this environment. Firstly, proper serialisation must be achieved. In the preferred embodiment, the same integrity protection mechanisms used by the operating system when updating page tables are used when making any updates to pagepoint tables and/or watchpoint structures. Typically this implies the use of a spinlock to guarantee serial access to resources.

The second issue is the synchronisation of pagepoints between the different processors. Thus synchronisation is required when watchpoints are used in a non-task specific context. This requires that page table entry updates made by the pagepoint manager are replicated to each processor's set of tables, assuming the page tables are assigned per processor (if the page tables are shared then an update from one processor serves all). Note that in either case, all processors will need to be resynchronised with the page tables after an update (analogous to step 430 of FIG. 4 for a single processor). In general, the use of an inter-processor communications mechanism is to achieve this (since such a mechanism is usually a standard device implemented within multi-processor operating systems it is not described further here).

Alternatively, if task-specific watchpoints are to be maintained then no synchronisation is required across processors. However since more than one task may be concurrently active, in fact one per processor, then the pagepoint manager may be required to maintain a single-step global status flag per processor in the case where the processor architecture discards lower priority interrupts when concurrent interrupts are generated (this would be the case for IA32).

The pagepoint mechanisms described so far have not distinguished the type of access being made at a watchpoint. Typically processor watchpoints can distinguish read from write access, and in some processor architectures they can also distinguish between execution and I/O operations.

In certain embodiments where the page fault mechanism allows types of access to be distinguished, it is also possible for a pagepoint scheme to differentiate according to type of access. As an example, consider the IA32 architecture, in which a writeable status flag in a page table entry is used to permit a store operation if set, and to deny the operation if the flag is not set. In the latter case, a page fault interruption occurs, and status information set by the processor enables the page fault handler to distinguish the reason for the page fault.

Thus there are two possible mechanisms generating pseudo-page-faults. In the first, setting a present status combined with writeable will generate a page fault on write but not on read. This combination therefore effectively provides a write access watchpoint. Alternatively, a not present status will generate a page fault on read and write regardless of the writeable status flag. In other words, not present with writeable can be utilised to set a read access watchpoint, and not present with not writeable can be utilised to set a read or write access watchpoint.

In such an embodiment, the status flags in the page table entry corresponding to the pseudo-page-fault need to be interrogated to distinguish the category of access, with the pagepoint manager saving both original present/not-present and the original writeable/not-writeable status in the corresponding pagepoint table entry. To ensure that this information remains accurate, the pagepoint manager must also intercept any process within the operating system that updates the writeable status (and/or the present status) of the corresponding pagepoint tables entries, to remain in synchronisation with the page manager.

Two preferred embodiments of the invention will now be described for the Linux operating system over IA32. The first is suitable for kernel mode and non-task-specific watchpoints and is managed within the kernel; the second is intended for task specific watchpoints to be managed by a user level debugger, in which breakpoint management is handled in user mode as in Linux and other UNIX operating systems. Only the aspects that are unique or specific to the implementation on Linux will be discussed here.

1) Non-task-specific Watchpoints

This implementation follows the general approach described earlier for a multi-tasking environment, with the following points of details and potential alternatives being of particular interest.

As an alternative to having pagepoint table entries for every page of virtual storage in the system, the pagepoint table can instead be allocated with enough space for the maximum number pagepoints expected to be active at a time. This is possible because when a page is marked as not present, there are available bits in the page table entry (PTE), which can be used to correlate a particular page of virtual storage with the index of its corresponding pagepoint structure. A similar technique is used by the current Linux page manager to locate an entry in the swap file that corresponds to a swapped out page. However, when a page is marked not-present artificially by the pagepoint manager then these additional bits within the PTE will be unused by Linux.

To support this approach, a pagepoint table entry contains the following additional piece of information, namely the virtual address of the page to which the pagepoint refers (this enables a distinction to be made between the existence of a pagepoint and a swapped-out page whose swap-entry index incidentally matches a pagepoint index).

In this embodiment therefore, under IA32, when a PTE has the not-present flag set, the remaining 31 bit positions within the PTE are available for use as a pagepoint table index. Pagepoint table entries are therefore allocated on a word boundary to accommodate a 32-bit address in 32 bits. Since the not-present bit is bit 0 and has a value 0 the entire PTE appears to be the pointer to the pagepoint table entry.

Figure 11:
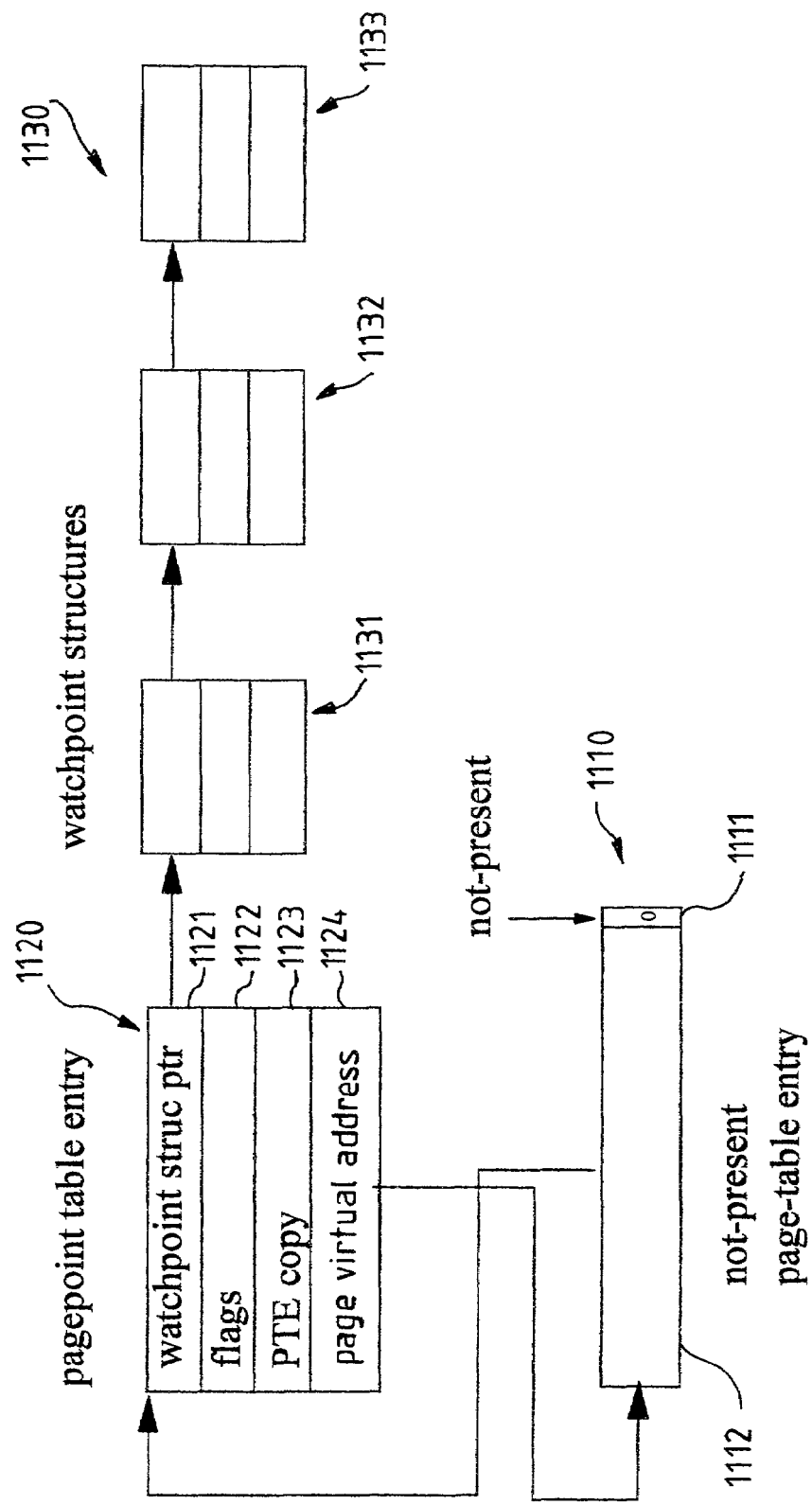
FIG. 11 depicts a particular mechanism for handling pagepoints in a preferred embodiment for the Linux operating system.

This approach is illustrated in FIG. 11, which corresponds in general terms to FIG. 3. Thus a single PTE 1110 is depicted in FIG. 11, which includes two fields, the first field is a single bit 1111 to denote status information, whilst the second field 1112 comprising the remaining 31 bits is used in accordance with this embodiment, for a not-present page, to reference the corresponding pagepoint table entry 1120. The pagepoint table entry includes four fields. The first of these 1121 is used to anchor a chain 1130 of watchpoint structures 1131, 1132, 1133, as already described in relation to FIG. 3. Fields 1121 and 1122 are used to store information such as the number of watchpoint structures in chain 1130, and a copy of the original presence information from field 1111 within PTE 1110, again essentially as described in relation to FIG. 3. Finally, the pagepoint table entry also includes the virtual address 1124 of the page controlled by the corresponding PTE. This can be used to confirm that field 1112 does genuinely contain a reference to a pagepoint table entry, rather than a reference for external memory that just happens to look like a pagepoint table entry.

The approach of FIG. 11 is most economical in a situation when the number of active pagepoints at any particular time is small compared to the total number of pages of virtual storage in the entire address space.

Figure 12:
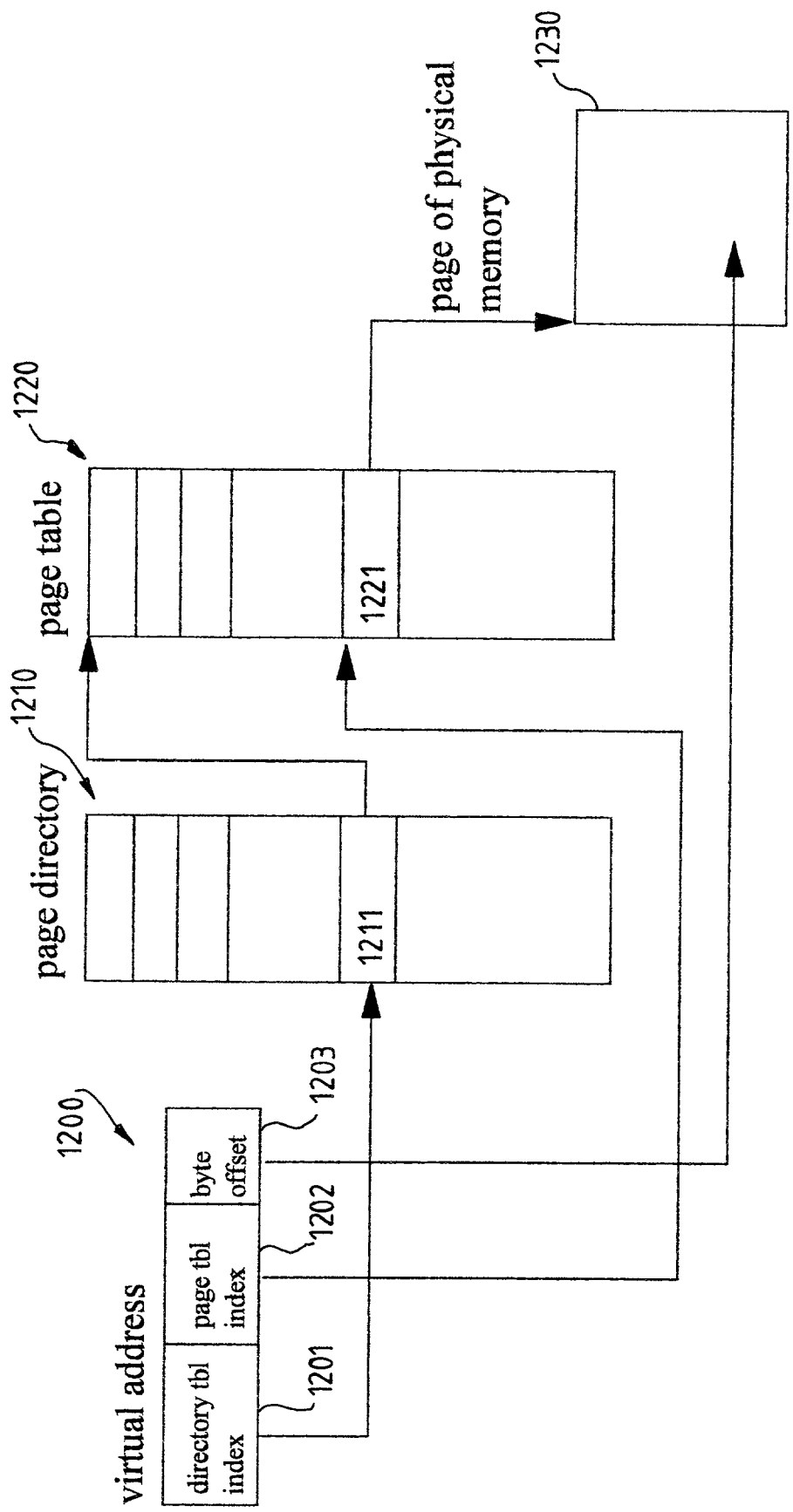
FIG. 12 illustrates a (conventional) mechanism for virtual address translation.

FIG. 12 illustrates the IA32 virtual address translation algorithm, which is used to confirm that the pagepoint table entry contains the correct virtual address. Thus a virtual address 1200 comprises three fields. The first of these 1201 locates a corresponding entry 1211 in the page directory 1210, which in turn identifies one page table 1220 out of a set of such page tables maintained on the system (the other page tables are identified by other entries in page directory 1210). The second field 1202 of the virtual address indicates an offset within the page table 1220, and in particular identifies a single entry 1221 within the page table. This entry in turn locates the actual page of physical memory 1230 containing the address of interest. Finally, the third component 1203 of the virtual address includes the byte offset within the page, to allow the precisely desired memory address to be accessed.

In performing the page table and pagepoint operations, serialisation with the page manager is achieved by acquiring the appropriate locks for the memory management structures. In other words, for kernel space, the mmap semaphore is first obtained, followed by the page_table_lock, which is located from the init_mm structure. Alternatively, for user space, the mmap semaphore is first obtained, followed by the page_table_lock, located from the mm structure of each task active on each processor (activation of pagepoints for inactive tasks is managed during the task context switch).

Figure 13:
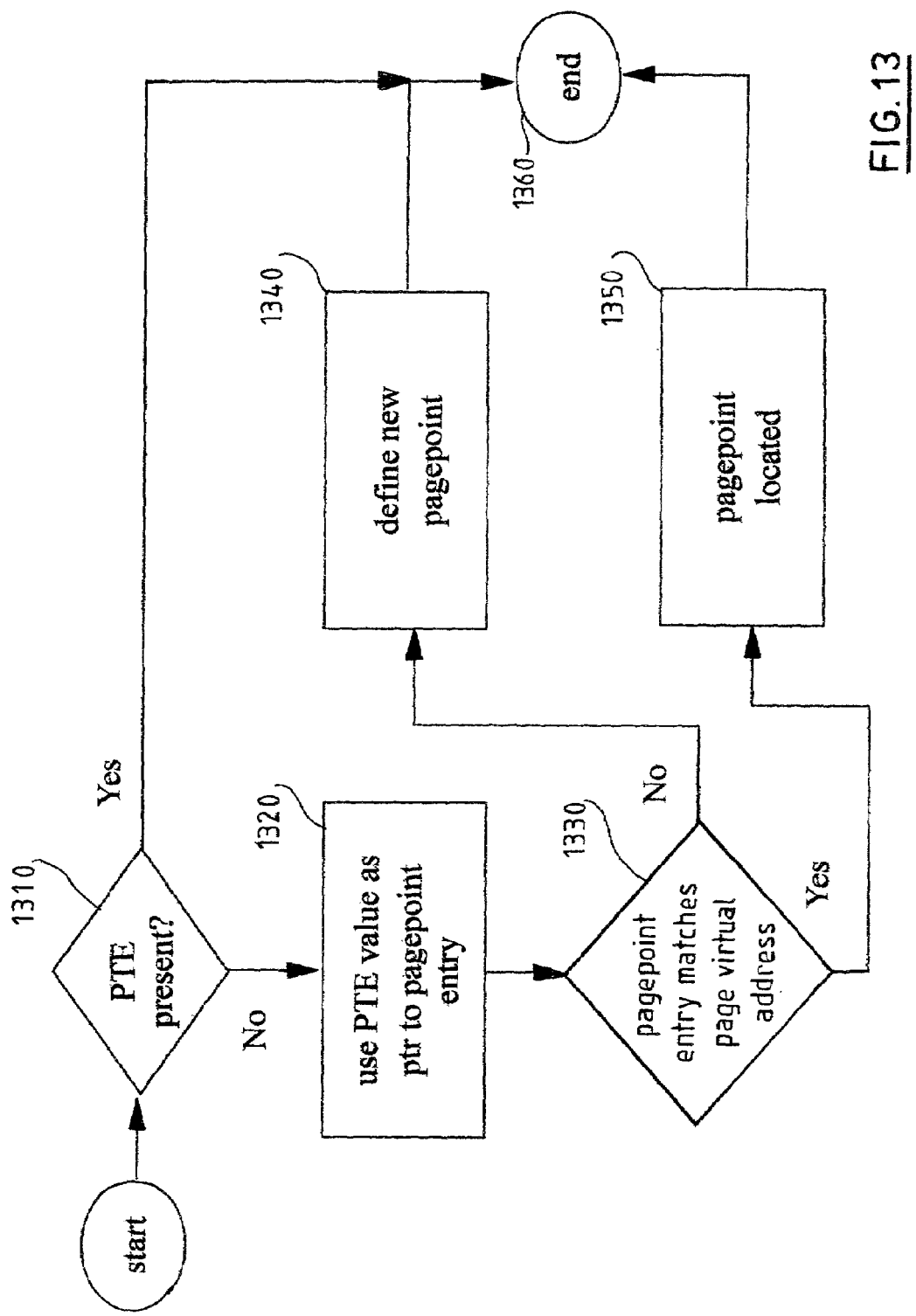
FIG. 13 illustrates the process for locating a pagepoint in one preferred embodiment under Linux.

The use of the arrangement of FIG. 11 results in the following processing for a PTE, as shown in FIG. 13. A first test is made to determine whether or not the page is present (step 1310). The presence of a pagepoint is indicated by a not present status in the PTE (field 1110 in FIG. 11). If the page is present, then it is handled in conventional fashion (not shown), since there is no pagepoint. On the other hand, if the page is not present, the index field from the PTE (1112) is used to locate the corresponding pagepoint entry table (step 1320). A comparison is now performed between the virtual address field in the pagepoint structure (1124) and the virtual address of the requested page (step 1330). If a match is found, then the correct pagepoint entry has been located (1350); alternatively, if there is no match, then the PTE simply represents a page for which no pagepoint has been defined, but rather which is currently out of memory, and so must be retrieved using the standard paging mechanism for further processing. Finally in this latter case, a new index is allocated for the pagepoint that was apparently referenced from the PTE (step 1340). The aim here is to try to avoid any future ambiguity in terms of apparent references to the pagepoint table (although such ambiguity can be resolved by the test of step 1330). Note that the rest of the process for handling pagepoints is the same as that described in the generic steps of FIG. 4, and so is not duplicated in FIG. 13.

On a multi-processor system, one complication arises if a watchpoint is to be effective globally across all process contexts, and the corresponding pagepoint address lies in the region of address space managed by task-specific page tables. In this case an additional step is necessary of using an Inter-processor interrupt (IPI) to propagate the page table changes to all processors. Additionally, the pagepoint entry must maintain the saved PTEs for every processor (because non-task-specific watchpoints are in use). If CR3 is reloaded during a task context switch then all active pagepoints must be reset both for the outgoing task, and also for the new task.

Considering now the implementation of the pseudo-page-fault handler in the Linux environment, one possibility would have been to call the pagepoint manager from within the memory management function that is used for bringing pages in, after all validations have been done and the memory management semaphore acquired. The advantage of such an approach is that it could also work in situations where pages are explicitly forced in (made present explicitly rather than relying on a page-fault interrupt) by a kernel function, in addition to page-faulting. Thus most of the ways in which a PTE entry could be updated would be intercepted.

However, this approach would suffer from the disadvantage that it could not properly handle watchpoints that are encountered by interrupt handler code. This is because handle_pte_fault( ), the routine that brings pages in, does not run when interrupts are disabled; the page fault handler invokes this routine only after ensuring that it was not invoked at interrupt time.

Thus the approach adopted in the preferred embodiment is to call the pagepoint handler from the page-fault handler code. In other words, the pagepoint handler is called from the do_page_fault( ) routine immediately after it has obtained the faulting address from the CR2 register. This routine runs with interrupts disabled (as mentioned earlier, the page-fault handler can be set up as an interrupt gate to achieve this under IA32). If the pagepoint handler returns indicating that it hasn't handled the pagepoint then interrupts are enabled before continuing with normal page fault handling. If the pagepoint is handled, then the code returns from the page fault handler so that subsequent processing may continue (including single-stepping as described above).

Note that the pagepoint handler must acquire the page_table_lock, for serialization reasons. To locate the pagepoint structure, it locates the PTE for the faulting address, and if the page is marked not-present it interprets the index field of the PTE as the pagepoint entry index, provided it is a valid index and the pagepoint entry contains the matching virtual address, as described above in relation to FIG. 13 (if these conditions are not met, then the pagepoint is not active). The page_table_lock is released after PTE access and updates are completed.

The subsequent stages of single-stepping and reinstating the pagepoint are as described above (see FIGS. 8 and 9). The single-step interrupt is intercepted from the do_debug( ) routine, which is the system exception handler for single-step. The single-step handler should also be serviced by an interrupt gate on IA32. The additional code ensures that the INTERRUPT flag of the EFLAGS register is restored after the watchpoint single-step handling is complete. Both the watchpoint commit and discard options can be provided, as explained above, depending on whether or not another interrupt is generated during the single-step. If the original PTE was marked not-present, then another page fault would be taken during a single-step. In this situation too, the pagepoint is re-instated, the single step is cleared and the rest of the page fault handler processing is allowed to continue. (As described in more detail below, the pagepoint manager can intercept swap-in processing to ensure that the correct PTE is used when bringing in the swapped out page).

Note that since a PTE may be altered by the handle_pte_fault( ) routine, which is used for bringing pages into physical memory, the pagepoint manager needs to intercept handle_pte_fault processing in multiple places to ensure the PTE contents are correct for the do_swap_page( ) function. In particular, the pagepoint manager redirects updates that otherwise would have been made to the PTE to the pagepoint table entry, without allowing the PTE contents to change (since this would provide an opportunity for watchpoints to be missed).

There is no necessity to intercept swap-out processing; pages that are marked not-present will not be swapped out. However, there is an impact on the system, more so if there are a large number of active pagepoints, because the presence of a pagepoint makes the page non-swappable once they've been brought into memory. To address this one could optionally intercept swap-out processing in multiple places to ensure that it references the true PTE entry saved in the pagepoint table entry. This would enable pagepoint pages to remain swappable.

2) Task Specific Watchpoints

In the case of task specific watchpoints, an alternative implementation is to use methods similar to those utilised by breakpoint management facilities provided for user level debuggers in Linux (and some other variants of the UNIX operating system). This requires the ptrace( ) system call to be extended with options to enable a user mode debugger to read and write the contents of any PTE that maps user space virtual addresses in the debugee and to temporarily mark a page as non-swappable. For this embodiment we define a new ptrace( ) commands as follows:

PTRACE_PEEKPTE—to read a debugee's PTE
PTRACE_POKEPTE—to write a debugee's PTE
PTRACE_PINMM—make a debugee's page temporarily non-swappable
PTRACE_UNPINMM—to restore the swappable state of the debugee's page By using these commands a debugger can manipulate the PTE of a debugee in such a way as to cause a segmentation fault signal (SIGSEGV) to be generated whenever the debugee tries to access an address in that page. This enables user mode debuggers to implement their own task-specific unlimited watchpoint extensions, without the task-specific watchpoints having to be tracked by the operating system kernel.

In particular, the debugger maintains its own task-specific pagepoint table, which is in a similar format to the table described for the non-task-specific case (see FIG. 11). Each entry has fields for saving the original PTE of the pagepoint, the virtual address of the corresponding page, a flag indicating whether the pagepoint is active and a pointer to a chain of watchpoint definition structures.

Figure 14:
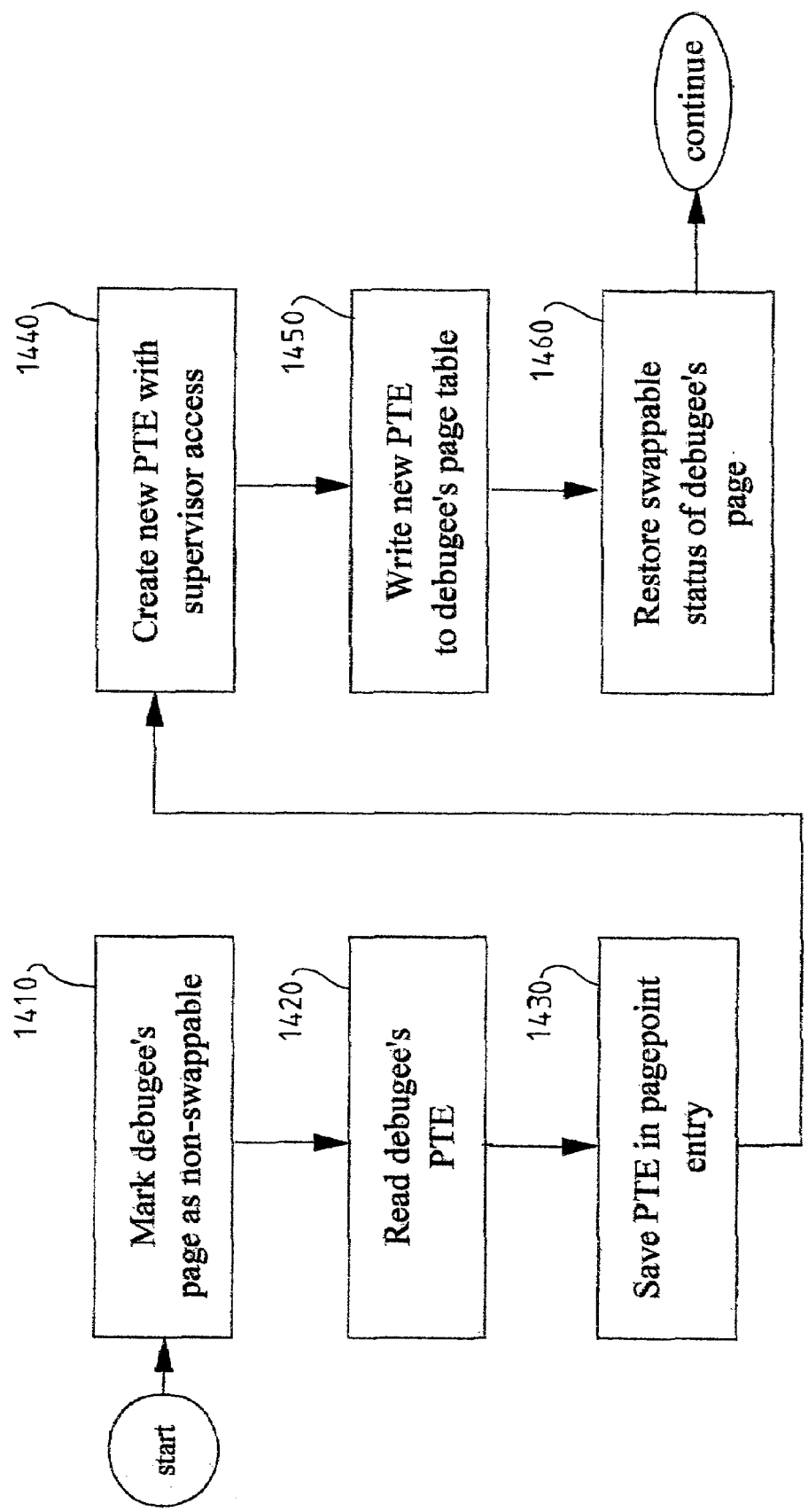
FIG. 14 illustrates the activation of task-specific watchpoints in one preferred embodiment under Linux.

To activate a pagepoint, which occurs when the first watchpoint for the corresponding page is activated, the debugger (which is expected to have already attached itself to the debugee) performs the processing illustrated in FIG. 14. The first action is to mark the debugee's page as temporarily non-swappable using PTRACE_PINMM (step 1410). The PTE contents for the relevant watchpoint address are then read using PTRACE_PEEKPTE (step 1420), and the original PTE contents are saved in the pagepoint entry (assuming that a pagepoint entry has already been set up and initialised with the virtual address of the pagepoint) (step 1430). This then permits the creation of a new PTE (step 1440), based on the read copy where the protection flag is set to Supervisor only access. This will result in a page-fault whenever the page is accessed by the debugee, since user space pages are never given supervisor access by Linux. Using this method avoids the need to intercept swap-in and swap-out processing since the true page present/not-present status is retained within its PTE.

When a page fault is generated due to such a protection violation, the kernel generates a SIGSEGV signal, which the debugger can intercept through standard interfaces supplied for a debugger application. In this embodiment, the debugger does not use the index field of the PTE to locate the pagepoint entry since that would require modifications to page management. Instead, uses either the virtual address of the page as an index or it applies some convenient hashing algorithm to the page address.

Next, the modified PTE is written back to the debugee's page table using PTRACE_POKEPTE (step 1450), and then finally the swappable state of the debugee's page is restored using PTRACE_UNPINMM (step 1460). After setting up the watchpoints, the debugee may be allowed to continue execution (it will have been halted when the debugger intercepted the SIGSEGV signal and also when the debugger was initially attached to the debugee).

Note that the Linux page-fault handler currently does not distinguish a page-fault caused by a write access to a read-only page from one caused by a user privilege program storing into a supervisor privilege page. However, this may be readily determined from the page-fault error code, which is presented to the operating system in Control Register 2 (CR2) at the time of interrupt. A minor extension to the page-fault handler therefore allows a distinction to be made between these two reasons for access violation.

In this embodiment, when any location within a page with an active pagepoint is accessed by the debugee task, a segmentation fault (SIGSEGV) is generated by the kernel. This happens because a page-fault is generated on access by the debugee which the kernel intercepts. The page fault occurs because the page is flagged as a supervisor access only, which prohibits user access. As a result of this the kernel sends a SIGSEGV signal to the debugee. This causes execution of the debugee to be suspended, and the debugger process, which is attached itself to the debugee, to receive notification of the SIGSEGV event.

Figure 15:
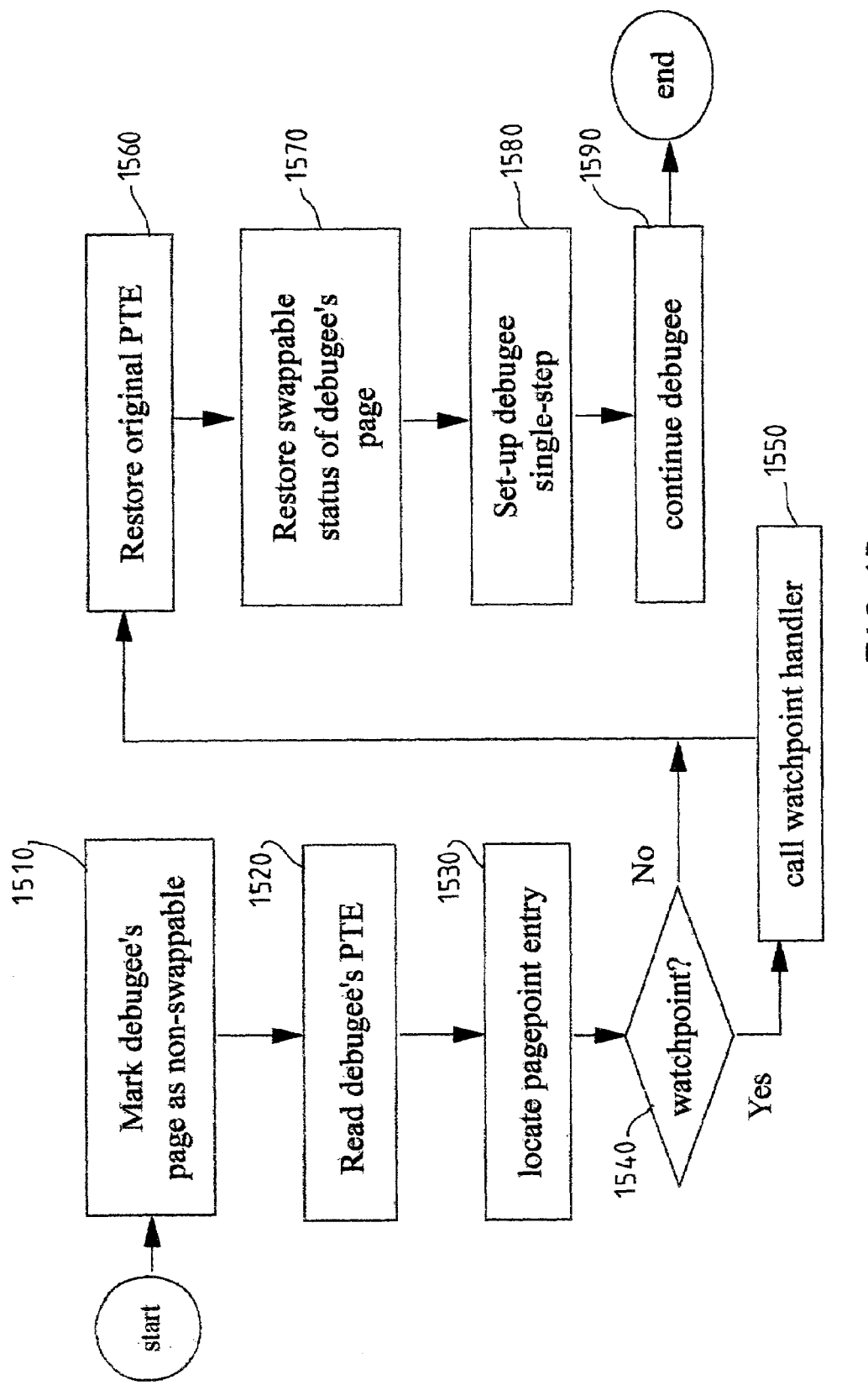
FIG. 15 illustrates the processing of pseudo-page faults in task-specific user space in one preferred embodiment under Linux.

The processing performed by the debugger on receipt of this notification is illustrated in FIG. 15. The method starts with using the call PTRACE_PINMM in order to mark the debugee's page as temporarily non-swappable (step 1510). Next, the PTE contents of the faulting address are read using PTRACE_PEEKPTE (step 1520), and corresponding pagepoint structure is located (if one exists) (step 1530). Note that any of the schemes described earlier for page to pagepoint cross-referencing can be adopted.

A test is now performed to see if the faulting address is a watchpoint (step 1540), and if so, the watchpoint handler is called (step 1550). Once this has completed, or if there is no watchpoint, the original PTE protection flag is restored using PTRACE_POKEPTE (step 1560). Following this, the swappable state of the debugee's page is restored using PTRACE_UNPINMM (step 1570). Single step operation is now set up in the debugee, using PTRACE_PEEKUSR and PTRACE_POKEUSR to set the TRACE flag in the debugee's EFLAGS register after saving the original value (step 1580). Finally, the debugee is allowed to continue using PTRACE_CONT (step 1590).

Figure 16:
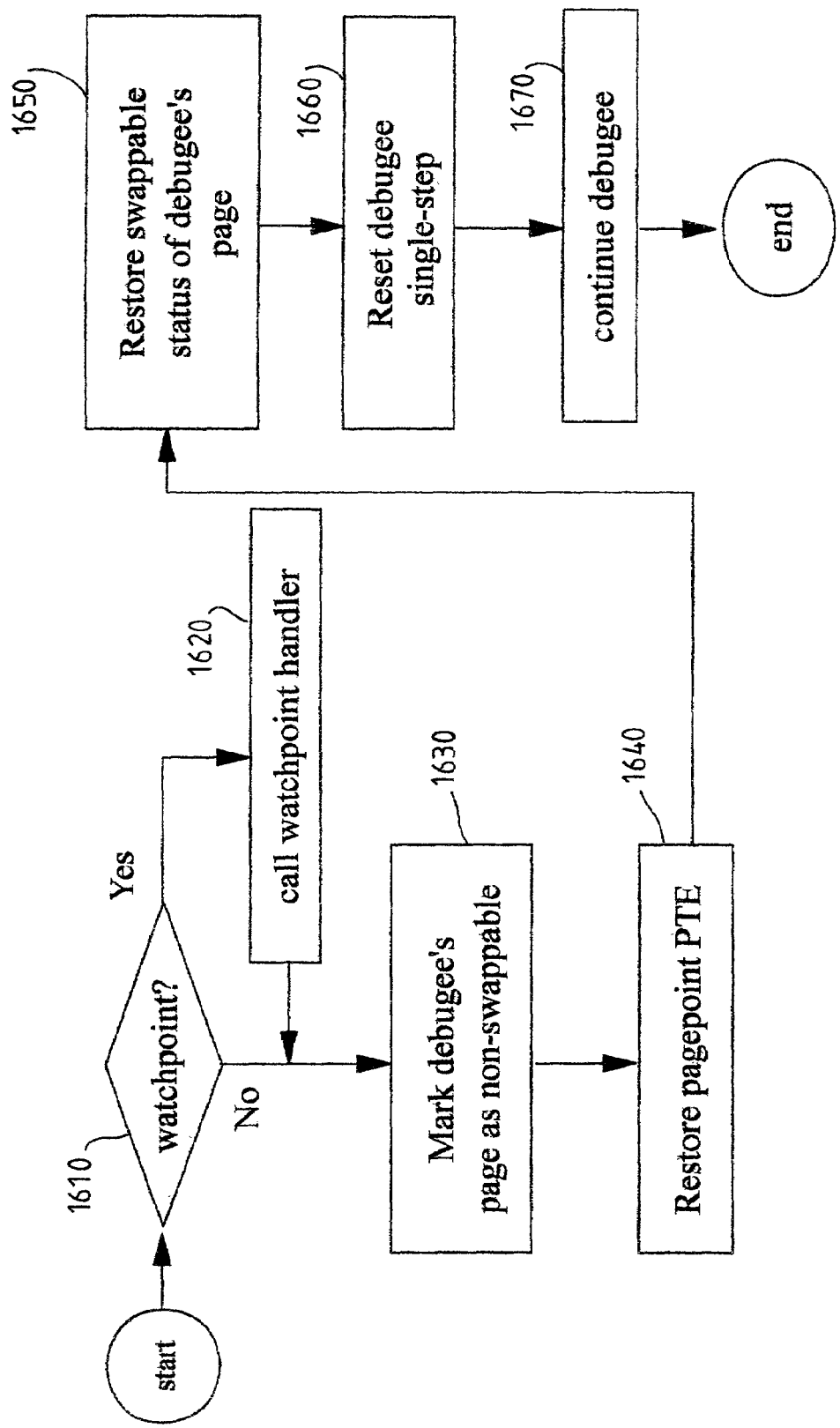
FIG. 16 illustrates the processing following single-stepping in task-specific user space in one preferred embodiment under Linux.

When the instruction completes executing, a single step interrupt is generated, and the debugee receives a SIGTRAP signal. This again causes the debugee to be stopped and the debugger to receive a notification. The debugger now proceeds as illustrated in FIG. 16. Firstly it is detected whether or not a watchpoint is present (step 1610), and if so, the watchpoint handler is called (step 1620). This can be regarded as watchpoint post-processing, and is optional, given that the watchpoint may already have been fully processed in FIG. 15.

Once the watchpoint has been processed, or directly if there is no watchpoint, the debugee page is marked as temporarily marked as non-swappable (step 1630), and the pagepoint is reinstated (step 1640), and then the swappable status of the page is restored (step 1650). These steps use calls PTRACE_PINMM, PTRACE_POKEPTE, and PTRACE_UNPINMM respectively. These steps modify the PTE appropriately, as described above in relation to initial activation of the pagepoint.

Next the debuggee is reset from single-step (step 1660), more particularly by resetting the TRACE flag for the EFLAGS register using PTRACE_PEEKUSR and PTRACE_POKEUSR. Finally, the debugee is allowed to continue execution (step 1670) using PTRACE_CONT The approach described above can be modified (optimised) for pagepoint pages that have very few watchpoints, if there are sufficient numbers of hardware watchpoint registers available to implement the watchpoints in one such page. Note that the mechanism assumes the existence of a mechanism for tracking and managing the number of available hardware watchpoint registers and for assigning them for use by various facilities.

The optimisation helps to reduce the number of extraneous page faults that would otherwise occur with data accesses to regions of the pagepoint page where no watchpoints are set. In particular, for sequential data, references have a high probability of being clustered within a region of same page, and a sequence of extraneous page-faults could be generated. Thus the facility to be able to delay reinstating a pagepoint can significantly improve performance in these circumstances. This is especially relevant for systems where larger page sizes are in use, in which the probability of generating extraneous page-fault interrupts is correspondingly increased. For example, this becomes an important consideration in an embodiment where Linux is running under IA32 and employs 4 Mb page sizes.

Note that pagepoint tracking itself is not affected by such an extension, but additional pagepoint manager structures are required to manage the assignment of hardware debugging registers. In addition, the pseudo-page-fault handler would perform the following additional steps prior to restoring the PTE:

1. Check whether the number of watchpoints in the page could be handled by the available hardware watchpoint registers. If not, then check whether releasing watchpoint registers in use by the pagepoint mechanism would allow the entire set of watchpoints within the page to be managed by the hardware alone. If not, skip the following steps and continue with the existing scheme.
2. If required, release watchpoint registers already in use by the pagepoint mechanism after reinstating their corresponding pagepoints.
3. Set-up watchpoint registers to implement all watchpoints for the page.
4. Set a flag to signal bypassing the single-step process in subsequent processing (under IA32 a hardware watchpoint generates a debug interrupt after the instruction referencing the watchpoint location has completed execution, so that single-stepping is therefore unnecessary).

When a debug exception occurs due to such a hardware watchpoint, which under IA32 may be distinguished from other debug exceptions using the DR6 register, then (optionally) watchpoint commit actions can be performed, followed by a return to the interrupted program.

Note that on a multiprocessor system, the watchpoint register settings need to be propagated to all processors that share the same page table entries. This can be achieved by sending an inter-processor interrupt (IPI) to those other processors.

Thus the techniques described herein provide a generic method for creating an unlimited number of watchpoints on a processor that supports a paging mechanism and a single-stepping mechanism. Although the preferred embodiment of the invention has largely been described in relation to the IA32 architecture in conjunction with the Linux operating system (and also the OS/2 operating system), it will be appreciated that the skilled person will be aware of how to extend the functionality taught herein to other architectures and platforms.

The invention claimed is:

1. A method of providing a watchpoint in a computer system, said computer system comprising a paging mechanism including a system page table, said method comprising the steps of:

modifying the system page table for a memory page containing a watchpoint, such that a page fault interrupt is triggered when said memory page is accessed;

providing a pagepoint table, wherein entries in the pagepoint table correspond to memory pages, and information stored in the pagepoint table defines the watchpoints contained within each page;

modifying the paging mechanism of the computer system, so that responsive to a page fault interrupt, a determination is made as to whether said interrupt has been triggered by an access to a watchpoint; and responsive to said determination being positive, passing control to a watchpoint handler, wherein said determination as to whether said interrupt has been triggered by an access to a watchpoint comprises the steps of:

testing, based on information stored in an entry in the system page table, whether the page for which the interrupt has been triggered contains any watchpoints, and if not, treating the interrupt as a standard page fault interrupt; and if the page for which the interrupt has been triggered contains a watchpoint, testing, based on information stored in an entry of the pagepoint table corresponding to the entry of the system page table for said interrupt, whether the address for which the interrupt has been triggered matches a watchpoint, and if not continuing with the application;

wherein it is determined that the interrupt has been triggered by an access to a watchpoint only if both these tests are positive.

2. The method of claim 1, where the pagepoint table contains one entry for each page of memory.

3. The method of claim 1, wherein the pagepoint table contains entries only for those pages that contain a watchpoint.

4. The method of claim 3, wherein a page table entry for a page which contains a watchpoint includes a reference to the entry in the pagepoint table for that page.

5. The method of claim 1, wherein a page table entry for a page includes a presence status which indicates whether or not that page is currently present in system memory, and wherein said step of modifying the system page table for a memory page containing a watchpoint comprises the step of setting the presence status for the page to indicate that such page is not currently present in memory.

6. The method of claim 5, further comprising the step of storing the presence status for a memory page, prior to modification, in the pagepoint table entry for that page.

7. The method of claim 1, wherein the computer system runs at least two tasks, and a different pagepoint table is defined for each task.

8. The method of claim 7, wherein each pagepoint table comprises a task-specific component and a generic component which is common to all tasks.

9. The method of claim 1, wherein the step of modifying the system page table includes synchronising any modifications to the system page table with a table lookup buffer on the system processor(s).

10. The method of claim 1, wherein the step of modifying the paging mechanism of the computer system comprises modification of an interrupt descriptor table, so that the code invoked responsive to a page fault interrupt is changed.

11. The method of claim 1, wherein the system page table for a memory page containing a watchpoint is modified such that a page fault interrupt is triggered only for certain types of access to said page.

12. A computer system supporting the provision of watchpoints and including:
  a system page table having a modified entry for a memory page containing a watchpoint, such that a page fault interrupt is triggered when said memory page is accessed;
  a pagepoint table, wherein entries in the pagepoint table correspond to memory pages, and information stored in the pagepoint table defines the watchpoints contained within each page;
  a paging mechanism, modified so that responsive to a page fault interrupt, a determination is made as to whether said interrupt has been triggered by an access to a watchpoint; and
  a watchpoint handler, which receives control responsive to said determination that the interrupt has been triggered by access to a watchpoint, wherein said determination as to whether said interrupt has been triggered by an access to a watchpoint comprises:
    testing, based on information stored in an entry of the system page table corresponding to said interrupt, whether the page for which the interrupt has been triggered contains any watchpoints, and if not, treating the interrupt as a standard page fault interrupt; and
    if the page for which the interrupt has been triggered contains a watchpoint, testing, based on information stored in an entry of the pagepoint table corresponding to the entry of the system page table for said interrupt, whether the address for which the interrupt has been triggered matches a watchpoint, and if not continuing with the application, wherein it is determined that the interrupt has been triggered by an access to a watchpoint only if both these tests are positive.

13. The system of claim 12, where the pagepoint table contains one entry for each page of memory.

14. The system of claim 12, wherein the pagepoint table contains entries only for those pages that contain a watchpoint.

15. The system of claim 14, wherein a page table entry for a page which contains a watchpoint includes a reference to the entry in the pagepoint table for that page.

16. The system of claim 12, wherein a page table entry for a page includes a presence status which indicates whether or not that page is currently present in system memory, and the system page table entry for a memory page containing a watchpoint is modified by setting the presence status for the page to indicate that it is not currently present in memory.

17. The system of claim 16, wherein the original presence status for a memory page, prior to modification, is copied into the pagepoint table entry for that page.

18. The system of claim 12, wherein the computer system runs at least two tasks, and a different pagepoint table is defined for each task.

19. The system of claim 18, wherein each pagepoint table comprises a task-specific component and a generic component which is common to all tasks.

20. The system of claim 12, further including means for synchronising any modifications to the system page table with a table lookup buffer on the system processor(s).

21. The system of claim 12, wherein the paging mechanism of the computer system is modified by altering the interrupt descriptor table, so that the code invoked responsive to a page fault interrupt is changed.

22. The system of claim 12, wherein the system page table for a memory page containing a watchpoint is modified such that a page fault interrupt is triggered only for certain types of access to said page.

23. A computer program comprising instructions recorded on a record medium, said program when executed on a computer system causing the system to perform the method steps of claim 1.

* * * * *